(12) United States Patent
Khan et al.

(10) Patent No.: US 12,547,768 B2
(45) Date of Patent: Feb. 10, 2026

(54) METHOD AND APPARATUS FOR ANONYMOUSLY IDENTIFYING SENSITIVE INFORMATION IDENTIFIERS

(71) Applicant: GENETEC INC., Saint-Laurent (CA)

(72) Inventors: Tahir Ali Khan, Saint-Laurent (CA); Mathieu Chevalier, Montreal (CA)

(73) Assignee: GENETEC INC., Saint-Laurent (CA)

(*) Notice: Subject to any disclaimer, the term of this patent is extended or adjusted under 35 U.S.C. 154(b) by 324 days.

(21) Appl. No.: 17/974,890

(22) Filed: Oct. 27, 2022

(65) Prior Publication Data

US 2024/0143834 A1 May 2, 2024

(51) Int. Cl.
*G06F 21/62* (2013.01)
*G06F 21/60* (2013.01)
*H04L 9/40* (2022.01)

(52) U.S. Cl.
CPC ........ *G06F 21/6254* (2013.01); *G06F 21/602* (2013.01); *H04L 63/302* (2013.01)

(58) Field of Classification Search
CPC ... G06F 21/6254; G06F 21/602; H04L 63/302
USPC .......................................................... 726/27
See application file for complete search history.

(56) References Cited

U.S. PATENT DOCUMENTS

| | | | |
|---|---|---|---|
| 9,363,357 B2 | 6/2016 | Hansen | |
| 9,779,284 B2 | 10/2017 | Meunier et al. | |
| 10,223,596 B1 | 3/2019 | Edwards et al. | |
| 2015/0312400 A1* | 10/2015 | Hansen | G06V 20/63 |
| | | | 455/414.1 |
| 2017/0178417 A1 | 6/2017 | Bekas et al. | |
| 2020/0356786 A1* | 11/2020 | Hannah | G08G 1/017 |

(Continued)

FOREIGN PATENT DOCUMENTS

| | | |
|---|---|---|
| CN | 107870983 A | 4/2018 |
| CN | 110572795 A | 12/2019 |
| CN | 110889520 A | 3/2020 |

(Continued)

OTHER PUBLICATIONS

John, Differences Between Fast Hashes and Slow Hashes, Jul. 7, 2012, https://openwall.info/wiki/john/essays/fast-and-slow-hashes (Year: 2012).*

(Continued)

*Primary Examiner* — Zi Ye

(57) ABSTRACT

A method and an apparatus for identifying sensitive information identifier in a privacy-protection manner are provided. The method is performed at a first computing entity which is configured to access a set of license plate numbers and to communicate with a second computing entity which is configured to obtain a license plate number that is captured by one of one or more license plate recognition (LPR) devices distributed in a certain geographic area. The method comprises: receiving a first hash value of the license plate number from the second computing entity; determining that the first hash value matches a second hash value of a plurality of hash values in an association relationship; and generating a notification of an identified license plate number. The association relationship maps a respective one of the plurality of hash values to a corresponding license plate number in the set of license plate numbers.

30 Claims, 9 Drawing Sheets

(56) References Cited

U.S. PATENT DOCUMENTS

2021/0036851 A1\* 2/2021 Villapakkam ......... G06F 21/602
2022/0189177 A1\* 6/2022 Petrey, Jr. ............ G06V 40/161

FOREIGN PATENT DOCUMENTS

| CN | 111582269 A | 8/2020 |
| CN | 112633281 A | 4/2021 |
| CN | 114093163 A | 2/2022 |
| JP | 2018169880 A | 11/2018 |
| KR | 20190048545 A | 5/2019 |
| WO | 2021078465 A1 | 4/2021 |
| WO | 2022033302 A1 | 2/2022 |

OTHER PUBLICATIONS

Jeremy, Double Encrypting with two different keys, Dec. 17, 2012, https://crypto.stackexchange.com/questions/5744/double-encrypting-with-two-different-keys (Year: 2012).\*

\* cited by examiner

METHOD AND APPARATUS FOR ANONYMOUSLY IDENTIFYING SENSITIVE INFORMATION IDENTIFIERS

FIELD

The present disclosure relates generally to privacy protection and, more particularly, to a computer-implemented method and apparatus for anonymously identifying sensitive information identifiers.

BACKGROUND

Sharing sensitive information between different organizations can allow organizations to collaborate to improve overall security or function. In particular, it could be useful for one organization to share data it gathers on activities e.g., on its premises, with another organization which is monitoring certain activities, persons or things. For example, a first organization (e.g., a business or neighborhood association) may want to share with an authority such as a headquarters, parent organization or law enforcement organization information about who or what their security systems (such as video monitoring systems (VMS), access control systems (ACS) an/or license plate recognition (LPR) systems) gathered so that the authority can be informed if a suspicious individual, thing or activity is detected at that first organization.

However, sharing sensitive information with different organizations may result in various privacy concerns. And privacy laws and regulations may forbid sharing certain gathered information particularly where it can be used to identify individuals. For example, a neighborhood may be monitored by a homeowner association (HOA) by capturing sensitive information (e.g., license plate numbers) in its neighborhood. In order to ensure the monitored neighborhood to be safe, some captured license plate numbers may be then sent to a law enforcement agency, such as police departments (PDs), to cause the PDs to verify if there is a suspicious vehicle (e.g., identified on a wanted list or other hotlist of vehicles of interest) around the neighborhood. Although the captured license plate numbers gathered at the HOA are considered as sensitive information, the HOA may want to share the sensitive information it gathers with the PDs even for vehicles which are not under suspicion. Accordingly, there exist privacy concerns to reveal or share the captured license plate numbers gathered at one organization to the other organization.

In addition, although the PDs maintain a hotlist of license plate numbers (e.g., a list of license plates that the PDs are looking for, such as stolen vehicles, vehicles associated with outstanding warrants, low-level misdemeanors, and traffic offenses, unpaid registration or renewal fees, etc.), the hotlist being tracked or any individual being targeted must not be divulged by the PDs in terms of targeting suspicious driver or event in the neighborhood. In other words, the authority or other organization with which data is being shared may have a hotlist, and that hotlist itself may be highly sensitive.

In some instances, law enforcement organizations may want to share data amongst each other to verify whether one person or license plate number or other identification data is on a list at another law enforcement organization but they cannot do so without revealing sensitive information. The Drug Enforcement Administration (DEA) may not want a local PD or a correctional facility to know that a particular individual is under investigation yet may need to know if the individual has been apprehended and is in custody.

In some applications, similar privacy concerns may occur with respect to other types of sensitive information, for example including personal identification information or personally identifiable information, which may be gathered by at least one of the ACSs, forms, biometric ID systems, and so on. For example, a particular casino may want to check if a person has been banned somewhere else by sharing gathered information (e.g., name, date of birth, home address, email address, fingerprint, etc.) of the person with other organizations, such as other casinos, which may store cheater databases or blacklists. Thus, the casino could verify individuals against the cheater databases of other casinos. However, sharing the gathered information with other organizations may result in privacy violation.

In addition, a company having multiple subsidiaries in different respective countries may hope to check if a contractor has been banned from working at another countries or locations without revealing the contractor's privacy.

In view of the foregoing, an improvement in an information sharing system would be desirable between different organizations (e.g., the law enforcement agency and other agencies) interested in monitoring dynamically unfolding events.

SUMMARY

The present disclosure describes a privacy-protection method which enables a first organization to check if an obtained sensitive information identifier is on a list that is accessible by a second organization without the first organization knowing the list and without the second organization knowing the sensitive information identifier if the sensitive information identifier is not already on the list.

In one example implementation, the obtained sensitive information identifier is a license plate number, which may be captured by a LPR device of a HOA. The HOA may wish to check if the obtained license plate number is suspicious or illegal. Accordingly, the HOA may share the obtained license plate number with the PD via a hash value, which is generated by performing a hashing algorithm on the obtained license plate number. Since the obtained license plate number is sent by means of the hash value, the obtained license plate number would not be able to be read by the PD or any parties intercepting the hash value. The PD maintaining a list, such as a hotlist, will determine whether there is a match between the received hash value and any entry of hash values in the hotlist. In particular, the PD also implements the hashing algorithm on a set of license plate numbers in the list and generates a set of hash values. Once the PD receives the hash values from the HOA, the PD determines if the received hash value matches any entry in the set of hash values. If so, it means that the license plate number obtained by the HOA is tracked by the PD, the PD may identify the license plate number and generate a notification, which may be used by a law enforcement officer. In addition, the PD may request the HOA to send additional information (license plate images, context images of the vehicle, timestamp, location) associated with the identified license plate number to facilitate further investigation. Once the law enforcement officer knows the location and reviews the license plate and context images, the law enforcement officer may go to the geographical area where the license plate number was captured in an attempt to pull over the vehicle associated with the identified license plate number.

In another example implementation, the obtained sensitive information identifier is a badge identification (ID) information or an ID defining identifier information of a person, such as a student, employee, or a contractor, in an access control system (e.g., badge reader, ID reader or system used to manage badge IDs, such as adding and/or removing users in the access control system). For example, the access control system may be of a first subsidiary of a company in a first country that may be in the process of creating a badge ID or an ID defining identifier information of a person. The first subsidiary may wish to check if the person was blacklisted by a second subsidiary of the company, for example, in a second country. Thus, the first subsidiary may share a hash value of the badge ID information (e.g., one or more of the person's name, a government issued identifier, such as a social insurance number, driver's license number, etc.) with the second subsidiary for confirmation. The hash value is produced by performing a hashing algorithm on the obtained ID information and then sent to the second subsidiary. Once the second subsidiary receives the hash value from the first subsidiary, the second subsidiary determines if the received hash value matches any entry in a set of hash values that have been generated by the second subsidiary performing the hashing algorithm on a blacklist of ID information. If it is determined that there is a match, it means that the person associated with the ID information at the first subsidiary was blacklisted. The second subsidiary may identify the person from the blacklist and send a notification to the first subsidiary that the person associated with ID information is on its blacklist. In some examples, the notification may include additional information of the person, such as the reason of banning the person, time when the person was banned, a time period when the person worked at the first subsidiary, and so on.

In yet another example implementation, the obtained sensitive information identifier is a biometric ID, which may be obtained by a biometric ID system of a first organization. For example, the first organization could be a first casino, which obtains a biometric ID of a person entering its premises. The biometric ID may include fingerprint and/or facial ID. The first casino wishes to know if the person associated with the biometric ID is in a list (e.g., cheater database) accessed or maintained by a second casino. Therefore, the first casino may utilize a conversion algorithm to covert the biometric ID into a serial of string and perform a hashing algorithm on the serial of string and send a hash value to the second casino. The second casino may implement the conversion algorithm to covert a plurality of biometric IDs in the cheater database to a plurality of serials of strings. Subsequently, the second casino may carry out the hashing algorithm on the plurality of serials of strings and generate a plurality of hash values. Once the second casino receives the hash values from the first casino, the second casino determines if the received hash value matches any entry in the generated plurality of hash values. If it is determined that there is a match, it means that the person associated with the ID read/recognized by the first casino cheated when he was gambling in the second casino. The second casino could identify the person from the cheater database and send a notification to the first casino that the person associated with the biometric ID is included in the cheater database. In some examples, the notification may include additional information of the person, such as a timestamp indicative a time of the person was caught to cheat, a reason why the person was caught to cheat, a game type where the person was caught to cheat, and so on. Thus, the first casino could employ information of the notification to determine whether the person is banned from the first casino's premises.

According to a first example aspect there is provided a computer-implemented method, which is performed at a first computing entity. The first computing entity is configured to access a set of license plate numbers and to communicate with a second computing entity which is configured to obtain a license plate number that is captured by one of one or more license plate recognition devices distributed in a certain geographic area. The method comprises: receiving a first hash value of the license plate number from the second computing entity; determining that the first hash value matches a second hash value of a plurality of hash values in an association relationship that maps a respective one of the plurality of hash values to a corresponding license plate number in the set of license plate numbers, each of the plurality of hash values having been generated by implementing a hash algorithm on the corresponding license plate number; and generating a notification of an identified license plate number, the identified license plate number being identified from the association relationship as corresponding to the first hash value that matches the second hash value.

In accordance with any of the preceding aspects, the method further comprises receiving a message from the second computing entity. The message includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, an encryption key used to generate the encrypted information includes the identified license plate number; and the method further comprises decrypting the message based on the identified license plate number being identified from the association relationship as corresponding to the first hash value that matches the second hash value.

In accordance with any of the preceding aspects, the method further comprises sending the notification of the identified license plate number to the second computing entity; and receiving a message from the second computing entity. The message includes information associated with the identified license plate number.

In accordance with any of the preceding aspects, the information includes at least one of an image capturing the identified license plate number, a context image capturing a vehicle associated with the identified license plate number, a timestamp indicative a time of capturing the identified license plate number, and an location indicative a location of the identified license plate number.

In accordance with any of the preceding aspects, the hash algorithm includes a slow hash algorithm which is configured with a desired design to generate the plurality of hash values.

In accordance with any of the preceding aspects, the method further comprises: prior to implementing the hash algorithm, adding a respective one of a plurality of unique salts to the corresponding license plate number. The plurality of unique salts correspond to an organization account of the first computing entity.

In accordance with any of the preceding aspects, a cloud server includes the first computing entity corresponding to a first organization account and/or the second computing entity corresponding to a second organization account that is different than the first organization account.

In accordance with any of the preceding aspects, the first computing entity and the second computing entity are two separate servers.

In accordance with any of the preceding aspects, the identified license plate number is identified by: looking up the association relationship; and obtaining the identified license plate number corresponding to the first hash value.

According to a second example aspect is a computer-implemented method, which is performed at a first computing entity configured to access a set of license plate numbers each of which is obfuscated to a corresponding one of a first plurality of obfuscated values and to communicate with a second computing entity via a third computing entity, the second computing entity being configured to obtain a second plurality of license plate numbers each of which is obfuscated to a corresponding one of a second plurality of obfuscated values, the second plurality of license plate number being captured by one or more license plate recognition devices distributed in a certain geographic area, the method comprises: receiving, from the third computing entity, a message indicating that a first obfuscated value from the first plurality of obfuscated values matches a second obfuscated value from the second plurality of obfuscated values; and generating a notification of an identified license plate number, the identified license plate number being identified from an association relationship as corresponding to the second obfuscated value that matches the first obfuscated value. The association relationship maps a respective one of the first plurality of obfuscated values to a corresponding license plate number in the set of the license plate numbers.

In accordance with any of the preceding aspects, the first plurality of obfuscated values include a first plurality of hash values, each of the set of license plate numbers being obfuscated by implementing a hash algorithm to generate a corresponding one of the first plurality of hash values; and the second plurality of obfuscated values include a second plurality of hash values, each of the second of license plate numbers being obfuscated by implementing the hash algorithm to generate a corresponding one of the second plurality of hash values.

In accordance with any of the preceding aspects, the method further comprises: receiving a message from the third computing entity. The message includes encrypted information associated with the identified license plate number.

In accordance with any of the preceding aspects, the first plurality of obfuscated values is generated using a secret key which is commonly used to generate the second plurality of obfuscated values, and the secret key is exclusively included in the first and second computing entity.

In accordance with any of the preceding aspects, a cloud server includes the first computing entity corresponding to a first organization account, the second computing entity corresponding to a second organization account, and/or the third computing entity corresponding to a third organization account, the first, second and third organization account being different with respect to each other.

In accordance with any of the preceding aspects, the first, second, and third computing entity are three separate servers.

In accordance with any of the preceding aspects, the identified license plate number is identified by: looking up the association relationship; and obtaining the identified license plate number corresponding to the second obfuscated value that matches the first obfuscated value.

According to a third example aspect is a computer-implemented method, which is performed at a first computing entity. The first computing entity is configured to access a set of license plate numbers and to communicate with a second computing entity which is configured to obtain a license plate number that is captured by one of one or more license plate recognition devices distributed in a certain geographic area, the method comprises: receiving a first subset of digits of a first obfuscated value from the second computing entity. The first obfuscated value corresponds to the license plate number. At least one second obfuscated value from a plurality of second obfuscated values is identified. Each of the at least one second obfuscated value includes the first subset of digits of the first obfuscated value. A second subset of digits of each of the identified at least one second obfuscated value is sent to the second computing entity. A message indicating that a certain obfuscated value of the identified at least one second obfuscated value matches the first obfuscated value is received from the second computing entity. In addition, a notification of an identified license plate number is generated. The identified license plate number is identified from an association relationship as corresponding to the certain obfuscated value of the identified at least one second obfuscated value that matches the first obfuscated value. The association relationship maps a respective one of the plurality of second obfuscated values to a corresponding license plate number of the set of license plate numbers.

In accordance with any of the preceding aspects, the message further includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, the second subset of digits includes entire digits of each of the identified at least one second obfuscated value.

In accordance with any of the preceding aspects, the second subset is less than remaining digits of each of the identified at least one second obfuscated value.

In accordance with any of the preceding aspects, the identified license plate number is identified by: looking up the association relationship; and obtaining the identified license plate number corresponding to the first obfuscated value.

According to a fourth example aspect is a computer-implemented method, which is performed at a first computing entity. The first computing entity is configured to access a second plurality of license plate numbers and to communicate with a second computing entity which is configured to obtain a license plate number that is captured by one of one or more license plate recognition devices distributed in a certain geographic area, the method comprises: receiving a first encrypted license plate number from the second computing entity, the first encrypted license plate number being generated by encrypting the license plate number with a first key using a commutative encryption algorithm; generating a second encrypted license plate number by encrypting the first encrypted license plate number with a second key using the commutative encryption algorithm; determining that the second encrypted license plate number matches a doubly encrypted license plate number in a doubly encrypted list that maps a respective one of a first plurality of doubly encrypted license plate numbers to a corresponding one of the second plurality of license plate numbers; and generating a notification of an identified license plate number, the identified license plate number being identified from the doubly encrypted list as corresponding to the second encrypted license plate number that matches the doubly encrypted license plate number.

In accordance with any of the preceding aspects, the method further comprises: generating a third plurality of encrypted license plate numbers by encrypting the second plurality of license plate numbers with the second key using the commutative encryption algorithm; sending the third plurality of encrypted license plate numbers to the second computing entity; and receiving the doubly encrypted list from the second computing entity. The doubly encrypted list maps the corresponding one of the second plurality of license plate numbers to a corresponding one of the third plurality of encrypted license plate numbers and to the respective one of the first plurality of doubly encrypted license plate numbers. The respective one of the first plurality of doubly encrypted license plate numbers was generated by encrypting the corresponding one of the third plurality of encrypted license plate numbers with the first key using the commutative encryption algorithm.

In accordance with any of the preceding aspects, the first key is periodically changed. When the first key is changed, the first plurality of doubly encrypted license plate numbers are re-generated by encrypting the corresponding one of the third plurality of encrypted license plate numbers with the changed first key using the commutative encryption algorithm, and the doubly encrypted list is updated to map the corresponding one of the second plurality of license plate numbers to a corresponding one of the third plurality of encrypted license plate numbers and to a respective one of the re-generated first plurality of doubly encrypted license plate numbers.

In accordance with any of the preceding aspects, the method further comprises: receiving a message from the second computing entity. The message includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, the identified license plate number is identified by: looking up the doubly encrypted list; and obtaining the identified license plate number corresponding to the second encrypted license plate number.

According to a fifth example aspect is an apparatus configured to access a set of license plate numbers and to communicate with a second computing entity which is configured to obtain a license plate number that is captured by one of one or more license plate recognition devices distributed in a certain geographic area. The apparatus comprises: one or more processor; memory; and one or more programs. The one or more programs are stored in the memory and configured to be executed by the one or more processors. The programs including: instructions for receiving a first hash value of the license plate number from the second computing entity; instructions for determining that the first hash value matches a second hash value of a plurality of hash values in an association relationship that maps a respective one of the plurality of hash values to a corresponding license plate number in the set of license plate numbers, each of the plurality of hash values having been generated by implementing a hash algorithm on the corresponding license plate number; and instructions for generating a notification of an identified license plate number. The identified license plate number is identified from the association relationship as corresponding to the first hash value that matches the second hash value.

In accordance with any of the preceding aspects, the programs further including: receiving a message from the second computing entity. The message includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, an encryption key used to generate the encrypted information includes the identified license plate number; and the programs further comprises decrypting the message based on the identified license plate number being identified from the association relationship as corresponding to the first hash value that matches the second hash value.

In accordance with any of the preceding aspects, the programs further comprise sending the notification of the identified license plate number to the second computing entity; and receiving a message from the second computing entity. The message includes information associated with the identified license plate number.

In accordance with any of the preceding aspects, the information includes at least one of an image capturing the identified license plate number, a context image capturing a vehicle associated with the identified license plate number, a timestamp indicative a time of capturing the identified license plate number, and an location indicative a location of the identified license plate number.

In accordance with any of the preceding aspects, the hash algorithm includes a slow hash algorithm which is configured with a desired design to generate the plurality of hash values.

In accordance with any of the preceding aspects, the programs further comprise: prior to implementing the hash algorithm, adding a respective one of a plurality of unique salts to the corresponding license plate number. The plurality of unique salts correspond to an organization account of the first computing entity.

In accordance with any of the preceding aspects, a cloud server includes the first computing entity corresponding to a first organization account and/or the second computing entity corresponding to a second organization account that is different than the first organization account.

In accordance with any of the preceding aspects, the first computing entity and the second computing entity are two separate servers.

In accordance with any of the preceding aspects, the identified license plate number is identified by: looking up the association relationship; and obtaining the identified license plate number corresponding to the first hash value.

According to a sixth example aspect is a computer readable storage medium having stored therein instructions, which when executed by a device, cause the device to: receive a first hash value of a license plate number from a second computing entity. The second computing entity is configured to obtain a license plate number and to communicate with the device that is configured to access a set of license plate numbers; determine that the first hash value matches a second hash value of a plurality of hash values in an association relationship that maps a respective one of the plurality of hash values to a corresponding license plate number in the set of license plate numbers, each of the plurality of hash values having been generated by implementing a hash algorithm on the corresponding license plate number; and generate a notification of an identified license plate number, the identified license plate number being identified from the association relationship as corresponding to the first hash value that matches the second hash value.

In accordance with any of the preceding aspects, the device is further caused to: receive a message from the second computing entity. The message includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, an encryption key used to generate the encrypted information includes the identified license plate number; and the programs further comprises decrypting the message based on the identified license plate number being identified from the association relationship as corresponding to the first hash value that matches the second hash value.

In accordance with any of the preceding aspects, the device is further caused to: send the notification of the identified license plate number to the second computing entity; and receive a message from the second computing entity. The message includes information associated with the identified license plate number.

In accordance with any of the preceding aspects, the information includes at least one of an image capturing the identified license plate number, a context image capturing a vehicle associated with the identified license plate number, a timestamp indicative a time of capturing the identified license plate number, and an location indicative a location of the identified license plate number.

In accordance with any of the preceding aspects, the hash algorithm includes a slow hash algorithm which is configured with a desired design to generate the plurality of hash values.

In accordance with any of the preceding aspects, the device is further caused to: prior to implementing the hash algorithm, add a respective one of a plurality of unique salts to the corresponding license plate number. The plurality of unique salts correspond to an organization account of the first computing entity.

In accordance with any of the preceding aspects, a cloud server includes the first computing entity corresponding to a first organization account and/or the second computing entity corresponding to a second organization account that is different than the first organization account.

In accordance with any of the preceding aspects, the first computing entity and the second computing entity are two separate servers.

In accordance with any of the preceding aspects, the identified license plate number is identified by: looking up the association relationship; and obtaining the identified license plate number corresponding to the first hash value.

According to a seventh example aspect is an apparatus configured to access a set of license plate numbers each of which is obfuscated to a corresponding one of a first plurality of obfuscated values and to communicate with a second computing entity via a third computing entity. The second computing entity is configured to obtain a second plurality of license plate numbers each of which is obfuscated to a corresponding one of a second plurality of obfuscated values, the apparatus comprises: one or more processor; memory; and one or more programs. The one or more programs are stored in the memory and configured to be executed by the one or more processors. The programs including: instructions for receiving, from the third computing entity, a message indicating that a first obfuscated value from the first plurality of obfuscated values matches a second obfuscated value from the second plurality of obfuscated values; and instructions for generating a notification of an identified license plate number, the identified license plate number being identified from an association relationship as corresponding to the second obfuscated value that matches the first obfuscated value. The association relationship maps a respective one of the first plurality of obfuscated values to a corresponding license plate number in the set of the license plate numbers.

In accordance with any of the preceding aspects, the first plurality of obfuscated values include a first plurality of hash values, each of the set of license plate numbers being obfuscated by implementing a hash algorithm to generate a corresponding one of the first plurality of hash values; and the second plurality of obfuscated values include a second plurality of hash values, each of the second of license plate numbers being obfuscated by implementing the hash algorithm to generate a corresponding one of the second plurality of hash values.

In accordance with any of the preceding aspects, the programs further comprise: receiving a message from the third computing entity. The message includes encrypted information associated with the identified license plate number.

In accordance with any of the preceding aspects, the first plurality of obfuscated values is generated using a secret key which is commonly used to generate the second plurality of obfuscated values, and the secret key is exclusively included in the first and second computing entity.

In accordance with any of the preceding aspects, a cloud server includes the first computing entity corresponding to a first organization account, the second computing entity corresponding to a second organization account, and/or the third computing entity corresponding to a third organization account, the first, second and third organization account being different with respect to each other.

In accordance with any of the preceding aspects, the first, second, and third computing entity are three separate servers.

In accordance with any of the preceding aspects, the identified license plate number is identified by: looking up the association relationship; and obtaining the identified license plate number corresponding to the second obfuscated value that matches the first obfuscated value.

According to an eighth example aspect is a computer readable storage medium having stored therein instructions, which when executed by a device which is configured to access a set of license plate numbers each of which is obfuscated to a corresponding one of a first plurality of obfuscated values and to communicate with a second computing entity via a third computing entity, the second computing entity being configured to obtain a second plurality of license plate numbers each of which is obfuscated to a corresponding one of a second plurality of obfuscated values, cause the device to: receive, from the device, a message indicating that a first obfuscated value from the first plurality of obfuscated values matches a second obfuscated value from the second plurality of obfuscated values; and generating a notification of an identified license plate number, the identified license plate number being identified from an association relationship as corresponding to the second obfuscated value that matches the first obfuscated value. The association relationship maps a respective one of the first plurality of obfuscated values to a corresponding license plate number in the set of the license plate numbers.

In accordance with any of the preceding aspects, the first plurality of obfuscated values include a first plurality of hash values, each of the set of license plate numbers being obfuscated by implementing a hash algorithm to generate a corresponding one of the first plurality of hash values; and the second plurality of obfuscated values include a second plurality of hash values, each of the second of license plate numbers being obfuscated by implementing the hash algorithm to generate a corresponding one of the second plurality of hash values.

In accordance with any of the preceding aspects, the device is further caused to: receive a message from the third computing entity. The message includes encrypted information associated with the identified license plate number.

In accordance with any of the preceding aspects, the first plurality of obfuscated values is generated using a secret key which is commonly used to generate the second plurality of obfuscated values, and the secret key is exclusively included in the first and second computing entity.

In accordance with any of the preceding aspects, a cloud server includes the first computing entity corresponding to a first organization account, the second computing entity corresponding to a second organization account, and/or the third computing entity corresponding to a third organization account, the first, second and third organization account being different with respect to each other.

In accordance with any of the preceding aspects, the first, second, and third computing entity are three separate servers.

In accordance with any of the preceding aspects, the identified license plate number is identified by: looking up the association relationship; and obtaining the identified license plate number corresponding to the second obfuscated value that matches the first obfuscated value.

According to a nineth example aspect is an apparatus configured to access a set of license plate numbers and to communicate with a second computing entity which is configured to obtain a license plate number that is captured by one of one or more license plate recognition devices distributed in a certain geographic area. The apparatus comprises: one or more processor; memory; and one or more programs. The one or more programs are stored in the memory and configured to be executed by the one or more processors, the programs including: instructions for receiving a first subset of digits of a first obfuscated value from a second computing entity. The first obfuscated value corresponds to a license plate number; instructions for identifying at least one second obfuscated value from a plurality of second obfuscated values. Each of the at least one second obfuscated value includes the first subset of digits of the first obfuscated value. Instructions are for sending a second subset of digits of each of the identified at least one second obfuscated value to the second computing entity. Instructions are for receiving, from the second computing entity, a message indicating that a certain obfuscated value of the identified at least one second obfuscated value matches the first obfuscated value; and instructions for generating a notification of an identified license plate number, the identified license plate number being identified from an association relationship as corresponding to the certain obfuscated value of the identified at least one second obfuscated value that matches the first obfuscated value. The association relationship maps a respective one of the plurality of second obfuscated values to a corresponding license plate number.

In accordance with any of the preceding aspects, the message further includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, the second subset of digits includes entire digits of each of the identified at least one second obfuscated value.

In accordance with any of the preceding aspects, the second subset is less than remaining digits of each of the identified at least one second obfuscated value.

In accordance with any of the preceding aspects, the identified license plate number is identified by: looking up the association relationship; and obtaining the identified license plate number corresponding to the first obfuscated value.

According to a tenth example aspect is a computer readable storage medium having stored therein instructions, which when executed by a device, cause the device to: receive a first subset of digits of a first obfuscated value from a second computing entity. The first obfuscated value corresponds to a license plate number; identify at least one second obfuscated value from a plurality of second obfuscated values. Each of the at least one second obfuscated value includes the first subset of digits of the first obfuscated value; send a second subset of digits of each of the identified at least one second obfuscated value to the second computing entity; receive, from the second computing entity, a message indicating that a certain obfuscated value of the identified at least one second obfuscated value matches the first obfuscated value; and generate a notification of an identified license plate number, the identified license plate number being identified from an association relationship as corresponding to the certain obfuscated value of the identified at least one second obfuscated value that matches the first obfuscated value. The association relationship maps a respective one of the plurality of second obfuscated values to a corresponding license plate number.

In accordance with any of the preceding aspects, the message further includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, the second subset of digits includes entire digits of each of the identified at least one second obfuscated value.

In accordance with any of the preceding aspects, the second subset is less than remaining digits of each of the identified at least one second obfuscated value.

In accordance with any of the preceding aspects, the identified license plate number is identified by: looking up the association relationship; and obtaining the identified license plate number corresponding to the first obfuscated value.

According to an eleventh example aspect is an apparatus which is configured to access a set of license plate numbers and to communicate with a second computing entity which is configured to obtain a license plate number that is captured by one of one or more license plate recognition devices distributed in a certain geographic area. The apparatus comprises: one or more processor; memory; and one or more programs. The one or more programs are stored in the memory and configured to be executed by the one or more processors. the programs include: instructions for receiving a first encrypted license plate number from a second computing entity, the first encrypted license plate number being generated by encrypting a license plate number with a first key using a commutative encryption algorithm; instructions for generating a second encrypted license plate number by encrypting the first encrypted license plate number with a second key using the commutative encryption algorithm; instructions for determining that the second encrypted license plate number matches a doubly encrypted license plate number in a doubly encrypted list that maps a respective one of a first plurality of doubly encrypted license plate numbers to a corresponding one of a second plurality of license plate numbers; and instructions for generating a notification of an identified license plate number, the identified license plate number being identified from the doubly encrypted list as corresponding to the second encrypted license plate number that matches the doubly encrypted license plate number.

In accordance with any of the preceding aspects, the programs further comprise: generating a third plurality of encrypted license plate numbers by encrypting the second plurality of license plate numbers with the second key using the commutative encryption algorithm; sending the third plurality of encrypted license plate numbers to the second computing entity; and receiving the doubly encrypted list from the second computing entity. The doubly encrypted list maps the corresponding one of the second plurality of license plate numbers to a corresponding one of the third plurality of encrypted license plate numbers and to the respective one of the first plurality of doubly encrypted license plate numbers. The respective one of the first plurality of doubly encrypted license plate numbers was generated by encrypting the corresponding one of the third plurality of encrypted license plate numbers with the first key using the commutative encryption algorithm.

In accordance with any of the preceding aspects, the first key is periodically changed. When the first key is changed, the first plurality of doubly encrypted license plate numbers are re-generated by encrypting the corresponding one of the third plurality of encrypted license plate numbers with the changed first key using the commutative encryption algorithm, and the doubly encrypted list is updated to map the corresponding one of the second plurality of license plate numbers to a corresponding one of the third plurality of encrypted license plate numbers and to a respective one of the re-generated first plurality of doubly encrypted license plate numbers.

In accordance with any of the preceding aspects, the programs further comprise: receiving a message from the second computing entity. The message includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, the identified license plate number is identified by: looking up the doubly encrypted list; and obtaining the identified license plate number corresponding to the second encrypted license plate number.

According to a twelfth eleventh example aspect is a computer readable storage medium having stored therein instructions, which when executed by a device, cause the device to: receive a first encrypted license plate number from a second computing entity, the first encrypted license plate number being generated by encrypting a license plate number with a first key using a commutative encryption algorithm; generate a second encrypted license plate number by encrypting the first encrypted license plate number with a second key using the commutative encryption algorithm; determine that the second encrypted license plate number matches a doubly encrypted license plate number in a doubly encrypted list that maps a respective one of a first plurality of doubly encrypted license plate numbers to a corresponding one of a second plurality of license plate numbers; and generate a notification of an identified license plate number, the identified license plate number being identified from the doubly encrypted list as corresponding to the second encrypted license plate number that matches the doubly encrypted license plate number.

In accordance with any of the preceding aspects, the device is further caused to: generate a third plurality of encrypted license plate numbers by encrypting the second plurality of license plate numbers with the second key using the commutative encryption algorithm; send the third plurality of encrypted license plate numbers to the second computing entity; and receive the doubly encrypted list from the second computing entity. The doubly encrypted list maps the corresponding one of the second plurality of license plate numbers to a corresponding one of the third plurality of encrypted license plate numbers and to the respective one of the first plurality of doubly encrypted license plate numbers. The respective one of the first plurality of doubly encrypted license plate numbers was generated by encrypting the corresponding one of the third plurality of encrypted license plate numbers with the first key using the commutative encryption algorithm.

In accordance with any of the preceding aspects, the first key is periodically changed. When the first key is changed, the first plurality of doubly encrypted license plate numbers are re-generated by encrypting the corresponding one of the third plurality of encrypted license plate numbers with the changed first key using the commutative encryption algorithm, and the doubly encrypted list is updated to map the corresponding one of the second plurality of license plate numbers to a corresponding one of the third plurality of encrypted license plate numbers and to a respective one of the re-generated first plurality of doubly encrypted license plate numbers.

In accordance with any of the preceding aspects, the device is further caused to: receive a message from the second computing entity. The message includes encrypted information associated with the identified license plate number.

In accordance with any of the preceding aspects, the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

In accordance with any of the preceding aspects, the identified license plate number is identified by: looking up the doubly encrypted list; and obtaining the identified license plate number corresponding to the second encrypted license plate number.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

Figure 1A:
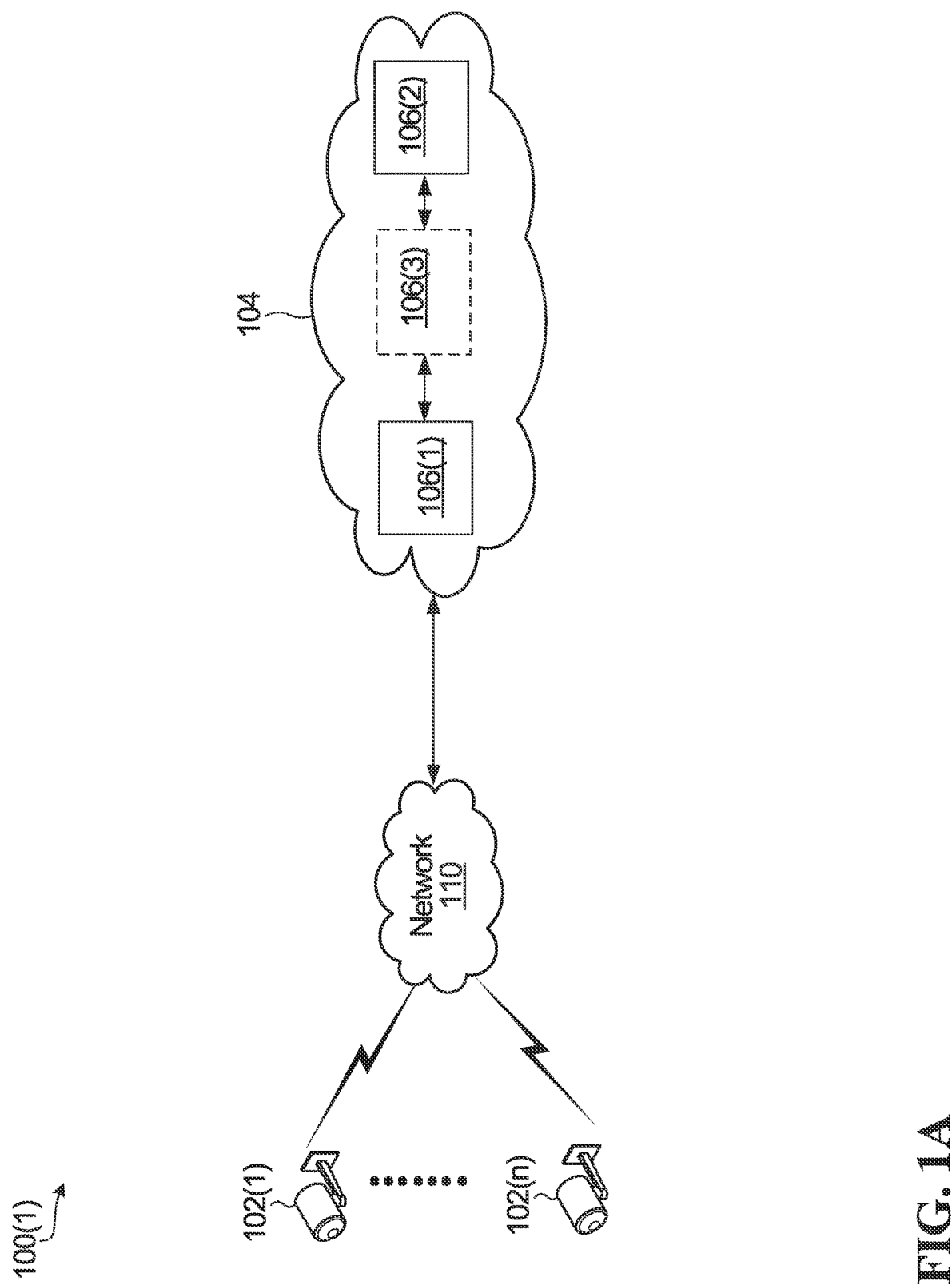
FIG. 1A is a schematic diagram of an example communication system in accordance with example embodiments.

In the drawings, embodiments are illustrated by way of example. It is to be expressly understood that the description and drawings are only for purposes of illustrating certain embodiments and are an aid for understanding. They are not intended to be a definition of the limits of the invention.

DESCRIPTION OF EXAMPLE EMBODIMENTS

The present disclosure is made with reference to the accompanying drawings, in which certain embodiments are shown. However, the description should not be construed as limited to the embodiments set forth herein. Rather, these embodiments are provided as examples. Also, like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine-readable medium.

Communication System

FIG. 1A is a schematic diagram illustrating an example communication system 100(1) comprising a plurality of electronic devices 102(1)-102(n) (generically referred to as electronic device 102) belonging to an organization or an association, such as a homeowner association (HOA). In the example of FIG. 1A, the electronic devices 102 are image processing devices which are at least part of video monitoring systems (VMSs) or license plate recognition (LPR) systems. Each image processing device 102 captures and collects footage of a geographic area (e.g., a neighborhood, a community, or a parking lot) to ensure security of the geographic area. The collected footage may include a type of sensitive information identifier, such as license plate number, occurred in the neighborhood. The license plate number may comprise any suitable combination of alphanumerical characters, and is not limited to numbers. In other examples, the electronic device 102 may be devices of ACSs, such as badge readers, which are configured to read badge identifications (ID), biometric ID systems configured to gather at least one face ID, fingerprint, and so on, or any suitably enabled device to gather personal identification information or personally identifiable information. The sensitive information identifier includes license plate number, badge ID, biometric ID, or any suitable personally identifiable information.

As shown in FIG. 1A, in addition, the communication system 100(1) includes a cloud server 104 running in a cloud computing environment. The cloud server 104 could provide cloud-based services to a plurality of different respective organizations each of which is associated with a respective cloud organization account 106(1)-106(3). In the example of FIG. 1A, the plurality of cloud organization accounts may include a first organization account 106(1), a second organization account 106(2), and an optional third organization account 106(3). In one example, the first organization account 106(1) is associated with the HOA. The second organization account 106(2) may belong to a law enforcement agency, such as a police department (PD), and the third organization account 106(3) may be an entity or an organization which is reliable to the HOA and the PD. In some applications, the third organization account 106(3) may include a third-party entity which is neither the HOA nor the PD. For example, the third organization account 106(3) may be a service provider that is common to the HOA and the PD. The third organization account 106(3) may be an entity or an organization which is trusted by the first organization account 106(1) and the second organization account 106(2) to act as an intermediary.

The image processing device 102 communicates with the cloud server 104 over a network 110 to transmit the collected footage to the cloud server 104. In some embodiments, the network 110 may include a radio access network (RAN) such as a cellular network. In other embodiments, the network 110 may be part of a wireless local area network (WLAN). The WLAN may comprise a wireless network which conforms to IEEE 802.11x standards (sometimes referred to as Wi-Fi®). Other configurations of the wireless network are possible in other embodiments. In addition, the network 110 has an infrastructure that supports a data communication protocol, such as a data exchange protocol (e.g., UDP or TCP/IP). In an example embodiment, the network 110 could be the Internet. The image processing device 102, may transmit images for processing at the cloud server 104 to identify the sensitive information contained therein. For example, the image processing device 102 may transmit a license plate image to a given organization account, such as the first organization account 106(1), to identify the license plate number in the license plate image. The image processing device may be a license plate recognition device. For example, the license plate recognition device may be the camera unit of the LPR system described in U.S. Pat. No. 11,188,776, the contents of which are hereby incorporated by reference, or may be any other suitable image processing device. The license plate recognition device may be a mobile LPR device, for example, installed in a patrol vehicle. The license plate recognition device may be a fixed license plate recognition device that is, for example, attached to a physical structure such as a post, a pole, etc. The license plate recognition device may be configured to capture one or more images of a license plate along with a license plate number. The license plate recognition device may be configured to capture one or more images of vehicles, such as those corresponding to the captured license plate images. The process for identifying a license plate number from a license plate image may comprise optical character recognition (OCR) to decide as to what license plate number is in the license plate image. The process for identifying a license plate number may be performed by the license plate recognition device or by a computing device in communication with the license plate recognition device. For example, the LPR system may comprise the license plate recognition device and the computing device in communication with the license plate recognition device.

In the example of FIG. 1A, the cloud server 104 could provide one or more cloud-based services for a respective account 106(1)-106(3) and store data associated with the respective organization account. Although the cloud server 104 stores data for the different respective organization accounts and provides services for each organization account, other organization accounts are not allowed to access data and services corresponding to a particular organization account. That means, the data and services for the particular organization account are segregated from data and services of the other organization accounts and are only accessible to the particular organization account. In this example, communications between the three organizations or the three organization accounts running on a platform of the cloud server 104 may be implemented internally on the platform. In other possible configurations, each of the three organization accounts may be associated with a different respective cloud server 104. In that case, communications between the three cloud organization accounts may be similar to those between three servers as discussed with reference to FIG. 1B below.

Figure 1B:
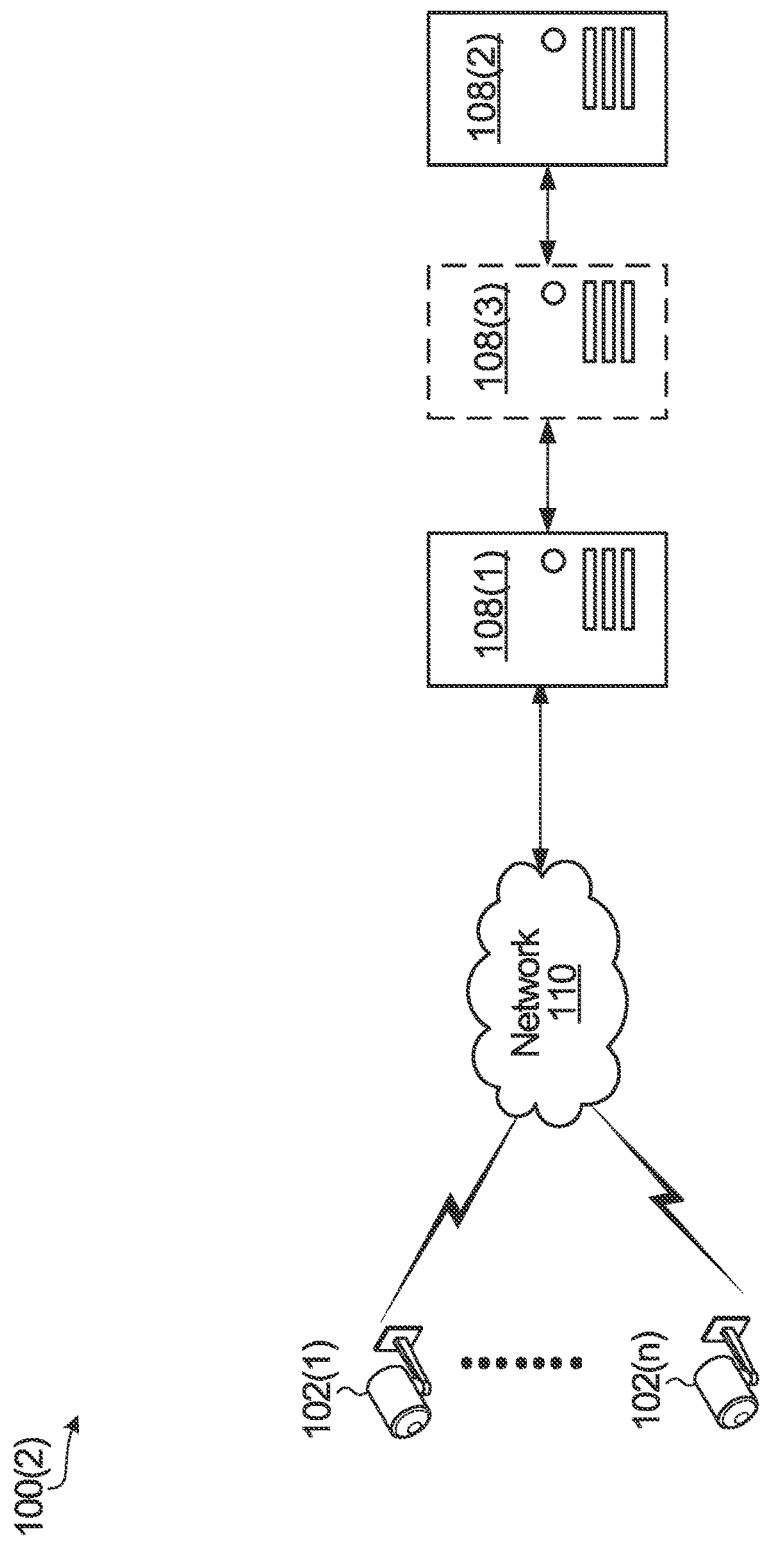
FIG. 1B is a schematic diagram of an alternative example communication system in accordance with alternative example embodiments.

FIG. 1B illustrates an alternative communication system 100(2) where a plurality of separate physical servers 108 (1)-108(3) (generically referred to as physical server 108) communicate with each other to implement a method of identifying a sensitive information identifier as described herein. The alternative communication system 100(2) is similar to the communication system 100(1) except that the cloud server 104 of FIG. 1A has a cloud-based server infrastructure to provide services to different respective organization accounts, whereas each physical server 108 is configured with hardware comprising physical components arranged in a specific configuration to provide services to a respective organization account. The plurality of physical servers 108 could be on-premises servers, different servers at different respective data centers, or three different cloud servers. Communications among the three physical servers 108(1)-108(3) with respect to each other may be established by any suitable communication links over the network 110, which may incorporate wired communication links or wireless communication links. The wireless communication links may be established in a WLAN, a cellular network, or a wireless person area network (WPAN). The WPAN includes a short-range wireless communication, for example including Bluetooth® communication or near field communication (NFC). In other examples, one or more of the physical servers 108(1)-108(3) may establish a peer-to-peer (P2P) or distribute computing environment. Various protocols, such as Advanced peer-to-peer networking (APPN), BitTorrent, Direct Connect, FastTrack, and so on, may be applied by the P2P communication.

In some examples, the image processing device 102 is a device capable of capturing images and/or recording videos and communicating with the cloud-based server 104 or the physical server 108. For example, the image processing device 102 could be a surveillance device such as a security camera or any other suitably enabled device that has an ability to capture images and/or videos of events occurring around a geographical area of the image processing device 102. In other examples, the device 102 could be any suitable enabled device, such as including a light detection and ranging (LIDAR), to capture or read personally identifiable information.

Thus, the communication systems 100(1)-100(2) (generically referred to as a communication system 100) of FIGS. 1A and 1B provide suitable network environment to enable the image processing device 102 to send captured sensitive information identifiers to a server or a cloud account which may belong to an organization account that is identical to that of the image processing device 102, via the network 110.

For ease of illustration, the remainder of this description will be focus on communications among the two physical severs 108(1), 108(2) or the three physical servers 108(1)-108(3) to identify the sensitive information identifier in response to a match between two obfuscated values (e.g., encrypted values and/or hash values) being determined.

Server

Figure 2:
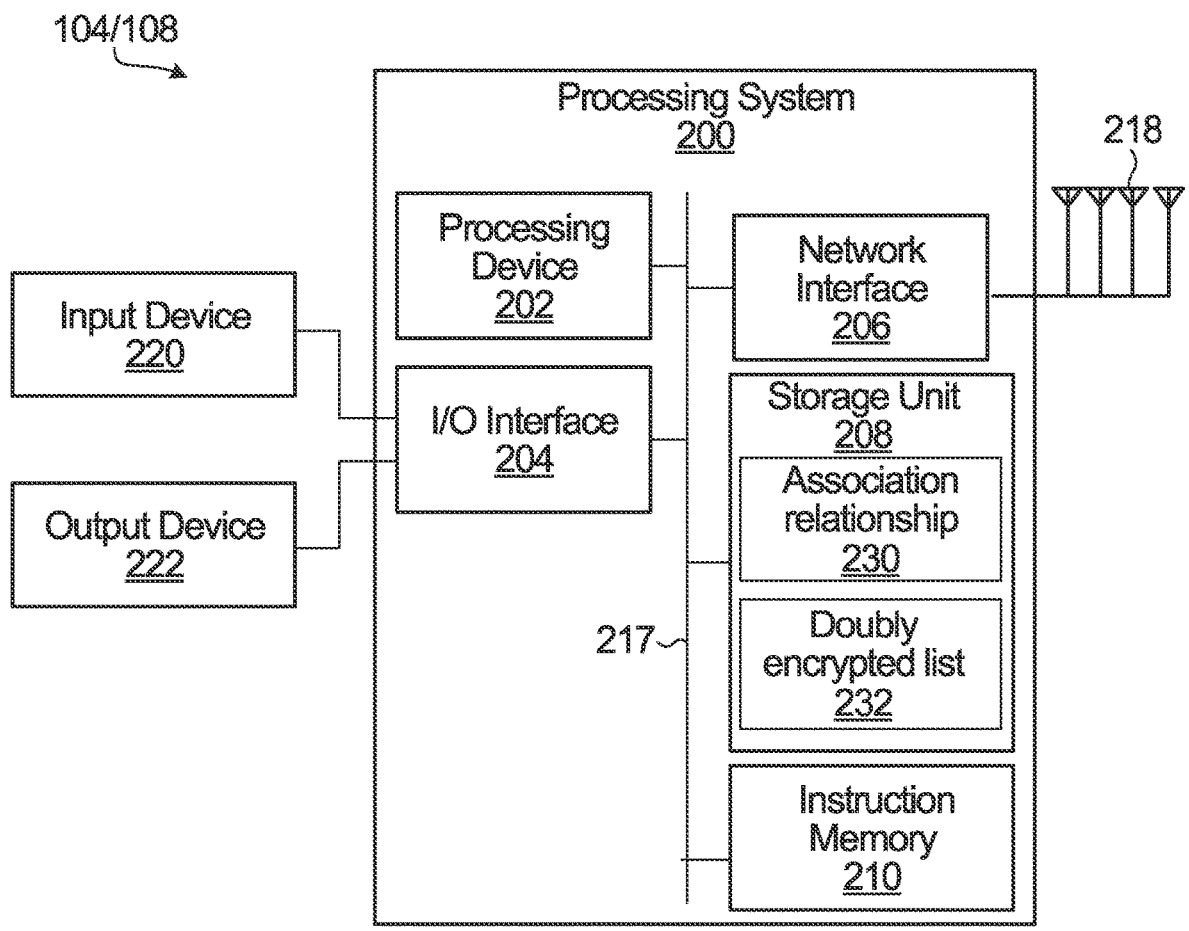
FIG. 2 is a block diagram illustrating an example processing system suitable for implementing a server in the communication systems of FIGS. 1A and 1B.

FIG. 2 is a block diagram of an example simplified processing system 200, which may be used to implement the cloud server 104 or the physical server 108. Although FIG.

2 shows a single instance of each component, there may be multiple instances of each component in the cloud server 104 or the physical server 108.

Taking the physical server 108 as an example, the processing system 200 may include one or more network interfaces 206 for wired or wireless communication with the communication network 110 or with other servers. The wired communication may be established via Ethernet cable. In addition, the processing system 200 comprises a suitably configured wireless transceiver 218 for exchanging at least data communications over wireless communication links. The wireless transceiver 218 could include one or more radio-frequency antennas. The wireless transceiver 218 could be configured for cellular communication or Wi-Fi communication. The wireless transceiver 218 may also comprise a wireless personal area network (WPAN) transceiver, such as a short-range wireless or Bluetooth® transceiver, for communicating with the other servers such as any of the physical servers 108(1)-108(3). The wireless transceiver 218 can also include a near field communication (NFC) transceiver. The wireless transceiver 218 is connected to a processing system 200, specifically via a network interface 206 of the processing system 200.

The processing system 200 may include a processing device 202, such as a central processing unit (CPU), a graphics processing unit (GPU), a tensor processing unit (TPU), a neural processing unit (NPU), an application-specific integrated circuit (ASIC), a field-programmable gate array (FPGA), a dedicated logic circuitry, or combinations thereof.

The processing system 200 may include one or more input/output (I/O) interfaces 204, to enable interfacing with one or more input devices 220 and/or output devices 222.

The processing system 200 may also include a storage unit 208, which may include a mass storage unit such as a solid state drive, a hard disk drive, a magnetic disk drive and/or an optical disk drive. In some examples, the storage unit 208 may store at least one of images, videos, context images, timestamps, and locations associated with the sensitive information identifier. In other possible configurations, the storage unit 208 may store any vehicle analytics, such as including manufacturer, model, color, type of the vehicle, and so on. Furthermore, the storage unit 208 may store one or more association relationship 230 which maps obfuscated values (e.g., encrypted or hash values) to corresponding sensitive information identifiers (e.g., license plate number, badge ID, or biometric ID). Alternatively, the storage unit 208 may store one or more doubly encrypted list 232 which maps doubly encrypted values to corresponding sensitive information.

The processing system 200 may also include an instruction memory 210, which may include a volatile or non-volatile memory (e.g., a flash memory, a random-access memory (RAM), a read-only memory (ROM), an erasable programmable ROM (EPROM), an electrically erasable programmable ROM (EEPROM), a flash memory and a CD-ROM, to name a few non-limiting possibilities). The instruction memory 210 may store instructions for execution by the processing device 202, such as to carry out example methods described in the present disclosure. The instruction memory 210 may store other software, such as an operating system and other applications/functions.

Additional components may be provided. For example, the processing system 200 may comprise an input/output interface 204 for interfacing with a user (e.g., an operator or an administrator) via input and/or output devices 220, 222, such as a display, keyboard, mouse, touchscreen and/or haptic module, for example. In FIG. 2, the input and output device 220, 222 are shown as external to the processing system 200. This is not intended to be limiting. In other examples, one or more of the input device 220 and the output device 222 may be integrated together and/or with the processing system 200. For example, the input device 220 and the output device 222 may be integrated as a single component, which may display a generated notification of an identified sensitive information, such as an identified license plate number.

There may be a bus 217 providing communication among components of the processing system 200, including the processing device 202, input/output interface 204, network interface 206, storage unit 208, and/or instruction memory 210. The bus 217 may be any suitable bus architecture including, for example, a memory bus, a peripheral bus or a video bus.

In some examples, some information used by the method disclosed herein may be stored at the physical server 108 and may be stored additionally or alternatively at the electronic device 102. In case the electronic device 102 is an image processing device, when the image processing device 102 captures an image or a video and sends the captured image to the physical server 108, the image processing device may determine a location where an event was captured based on content of the image and send the location to the physical server 108. The image processing device may be associated with a location known to the server. The image processing device may comprise, or be connected to, a GPS unit for obtaining the location of the camera, which can be transmitted to the physical server 108. In these cases, the image processing device and/or the physical server 108 may store the location. In one possible configuration, the image processing device 102 sends the captured image to the physical server 108, and then the physical server 108 will determine the location where the event was captured and store the determined location.

In implementations where the electronic device 102 is a badge reader in an ACS, the badge reader 102 reads badge IDs and sends the badge IDs to the physical server 108. The badge reader 102 may determine personal information (e.g., name, email address, and/or home address) associated with each badge ID. In addition, the badge reader 102 may store a timestamp when the badge ID is read and a location where the badge ID is read. The location where the badge ID is read may be identical to a location where the badge reader 102 is disposed. The badge reader 102 then sends the at least one of personal information, timestamp, and the location of the badge ID to the physical server 108, and the physical server 108 will store the received at least one of personal information, time stamp, and the location of the badge ID. In some examples, the badge reader 102 may send the obtained badge ID to the physical server 108 directly, and then the physical server 108 determines the personal information (e.g., name, email address, and/or home address) associated with each badge ID by looking up a stored personal information table and determines the location of badge ID by ascertaining the location of the badge reader 102.

In implementations where the electronic device 102 is a biometric ID system which retrieves and gathers face ID, fingerprint, and any suitable biometric IDs, the biometric ID system 102 sends the retrieved biometric IDs to the physical server 108. Processes of determining and/or storing information associated with each biometric ID, for example including at least one of an image capturing the biometric ID, personal information (e.g., name, email address, and/or home address), a timestamp when the biometric ID is captured, and a location where the biometric ID is read, may be analogous to those associated with each badge ID.

The server 108 may additionally communicate with a computer or other user device over a physical link such as a data port (e.g., USB port), which can occur during server setup or diagnostics testing, for example.

Method

The present disclosure describes an example method herein that provides a solution to identify sensitive information, such as license plate number, badge ID, or biometric ID, in an obfuscated manner such that the sensitive information will not be compromised or divulged over multiple organizations. The disclosed methods and systems may be used in various applications, including implementation in distributed security systems.

Figure 3:
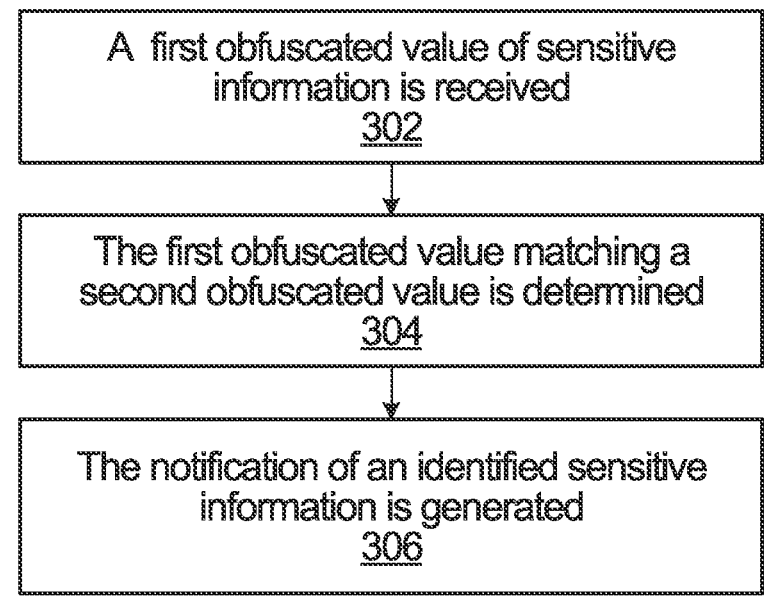
FIG. 3 is a flow chart illustrating a method of identifying a sensitive information identifier in accordance with example embodiments.

FIG. 3 illustrates a method of identifying a sensitive information identifier which may be implemented at a first computing entity or a third computing entity in accordance with example embodiments. The first computing entity or the third computing entity may be able to check if the sensitive information identifier transmitted from a second computing entity is in a maintained list without the first or third computing entity knowing the sensitive information identifier. Furthermore, there is no need for the second computing entity to know if the sensitive information identifier is maintained in the list.

The first computing entity may be associated with a first organization, for example including a law enforcement agency (e.g., the PD) or an organization which maintains a hotlist, a wanted list, or any other suitable list (e.g., a casino storing a cheater database, a subsidiary running a blacklist of worker being banned from working in a country where the subsidiary is located). The first computing entity may include the second organization account 106(2) running on a cloud-based environment as shown in FIG. 1A or the physical server 108(2) in FIG. 1B.

The second computing entity belongs to a second organization, such as the HOA or an organization which gathers the sensitive information identifier from the electronic devices 102. The second computing entity may be configured with the first organization account 106(1) running on the cloud-based environment as shown in FIG. 1A or the physical server 108(1) of FIG. 1B.

The third computing entity may be a third organization that is different than the first organization and the second organization. The third organization may be a third-party organization that is reliable to the first and second organization. The third computing entity may be associated with the third organization account 106(3) on the cloud-base environment of FIG. 1A or the physical server 108(3) as presented in FIG. 1B. The method 300 comprises:

At step 300, the first computing entity receives a first obfuscated value of the sensitive information identifier from the second computing entity. In a distributed security system example, the first computing entity is the PD, and the second computing entity may belong to the HOA. The sensitive information identifier comprises a license plate number. The HOA may obtain a sequence of license plate numbers continuously each of which may be captured by the image processing device 102 that is remotely disposed in a neighborhood. However, since the HOA is not sure whether a respective one of the sequence of license plate numbers is a suspicious number, the HOA may need to obfuscate the license plate number prior to sharing the obtained license plate number with the PD.

In a scenario where an organization may wish to check if any person entering its premise is in a blacklist that is maintained by another organization, the sensitive information identifier may include biometric ID (e.g., face ID, fingerprint, etc.) or badge ID (e.g., name, government issued identifier, etc.). For example, the first computing entity belongs to a first casino maintaining a cheater database, the second computing entity may belong to a second casino which gathers biometric IDs of persons entering the second casino. The second computing entity may gather a plurality of biometric IDs each of which may be read by the biometric ID system 102 that is disposed in the second casino. The first and second casino may belong to an identical company, two different companies in a same area or different areas, or be any suitable organizations. As the second casino wants to check whether persons gambling in its premises are cheaters, especially those persons that are not in their record, the second computing entity may need to apply a conversion algorithm on each obtained biometric ID to convert the biometric ID to a sequence of strings and to obfuscate the sequence of strings to generate the first obfuscated value of the biometric ID prior to sharing the gathered biometric ID with the first computing entity of the first casino. After the obfuscation, the second computing entity of the second casino sends the first obfuscated value of the biometric ID to the first computing entity of the first casino.

In other examples, the first computing entity is a first subsidiary of a company. The first subsidiary may be located in a first country and maintain a blacklist which includes a plurality of badge IDs or other types of IDs each corresponding to a worker that was banned from working at the first subsidiary. The second computing entity of a second subsidiary of the company located in a second country may need to determine if a person potentially hired by the second subsidiary is in the blacklist. Thus, the second computing entity obtains a badge ID of the person and obfuscates the badge ID prior to sharing the retrieved badge ID with the first computing entity. Once the obfuscation is completed, the second computing entity of the second subsidiary sends the first obfuscated value of the badge ID to the first computing entity.

The term "obfuscate" disclosed herein means performing an irreversible algorithm (e.g., a hash algorithm) and/or performing a reversible algorithm (e.g., encryption), which can be performed on the sensitive information identifier, such as the obtained license plate number, the obtained biometric ID, the obtained badge ID, or any possible personally identifiable information or any suitable privacy information of interest. In some embodiments, obfuscating comprises hashing the sensitive information to generate the obfuscated value. In some embodiments, obfuscating comprises encryption the sensitive information to generate the obfuscated value. In some embodiments, comprises hashing the sensitive information to generate a hash, and then encrypting the hash of the sensitive information to generate the obfuscated value.

At step 304, it is determined that the first obfuscated value matches a second obfuscated value of a plurality of obfuscated values in an association relationship. The first computing entity may store or access a set of sensitive information identifiers that are maintained in a list (e.g., hotlist, blacklist, or a cheater database) and generate the plurality of obfuscated values by performing an obfuscated algorithm on the set of sensitive information. Thus, the association relationship is generated to map a respective one of the plurality of obfuscated values to a corresponding sensitive information identifier in the set of sensitive information. In some examples, the associated relationship is indicated in a matching table. Each row of the matching table includes the respective one of the plurality of obfuscated values and each of a plurality of record IDs pointing to the corresponding sensitive information. Each of the plurality of record IDs is generated by creating information associated with the sensitive information.

In implementations where the sensitive information identifier includes a license plate number, for a given license plate number in a hotlist, a record ID may be created to include at least one of manufacturer, model, analytics, state or province of a vehicle associated with the given license plate number.

In implementations where the sensitive information identifier is a badge ID, for a given badge ID in a list, a record ID may be created to include at least one of name, date of birth, home address, email address of a person associated with the given badge ID.

In implementations where the sensitive information identifier is a biometric ID, for a given biometric ID in a list, a record ID may be created to include at least one of name, date of birth, home address, email address, nationality, height, country of born, color of eyes of a person associated with the given biometric ID.

In some embodiments, the matching table maps the respective one of the plurality of obfuscated values and the corresponding sensitive information. When the first computing entity receives the first obfuscated value, the first computing entity looks up the association relationship and determines that the second obfuscated value in the association relationship matches the first obfuscated value. Furthermore, once the second obfuscated value is determined to match the first obfuscated value, sensitive information identifier corresponding to the second obfuscated value is also identified from the association relationship.

At step 306, a notification of an identified license plate number is generated. Once the first computing entity identifies the identified sensitive information, the first computing entity may generate the notification to the user, such as an operator or an administrator of the organization account 106(2) associated with the first computing entity or a server 108(2) associated with the first computing entity. The notification indicates that the received first obfuscated value matches an entry in the list maintained by the first computing entity.

In implementations where the first computing entity is associated with the PD, the notification may be generated to notify an officer that the first obfuscated value received from the HOA matches an entry in the hotlist maintained by the PD. That means, the license plate number associated with the first obfuscated value is an entry in the hotlist of PD and is associated with a vehicle that the PD is looking for.

In implementations where the first computing entity belongs to a first casino, the notification may be generated to notify managers of the first casino and/or the second casino that the first obfuscated value received from a second casino matches an entry in a cheater database accessed by the first casino. That is to say, a person corresponding to the biometric ID associated with the first obfuscated value is a cheater that was caught and recorded in the first casino.

In implementations where the first computing entity belongs to a first subsidiary of a company, the notification may be generated to notify human resources (HR) managers of the company that the first obfuscated value received from a second subsidiary of the company matches an entry in a blacklist accessed by the first subsidiary. That is to say, a person corresponding to the biometric ID or the badge ID associated with the first obfuscated value is banned from working in a country where the first subsidiary is located.

It should be appreciated that although the first computing entity is illustrated as an entity to receive the first obfuscated value of the sensitive information identifier and to compare the first obfuscate value to the plurality of obfuscated values in the association relationship, this is an example and not intended to be limiting. In other examples, the third computing entity, rather than the first computing entity, may receive the first obfuscated value of the sensitive information identifier at step 302 and to compare the first obfuscated value to the plurality of obfuscated values in the associated relationship at step 304.

It is also noted that the set of sensitive information identifiers are only accessible to the first computing entity and inaccessible to the second or the third computing entity. When the third computing entity is used to determine whether there is a match, the set of sensitive information identifiers may be obfuscated by the first computing entity and then be sent to the third computing entity. Thus, the third computing entity does not know the set of sensitive information identifiers, which may help to avoid privacy breach of a list of sensitive information identifiers at the first computing entity.

Since the sensitive information identifier is sent with an obfuscated manner over multiple servers belonging to different respective organizations, the sensitive information identifier is prevented from being divulged while the sensitive information identifier is determined to be suspicious.

Implementation 1

Figure 4:
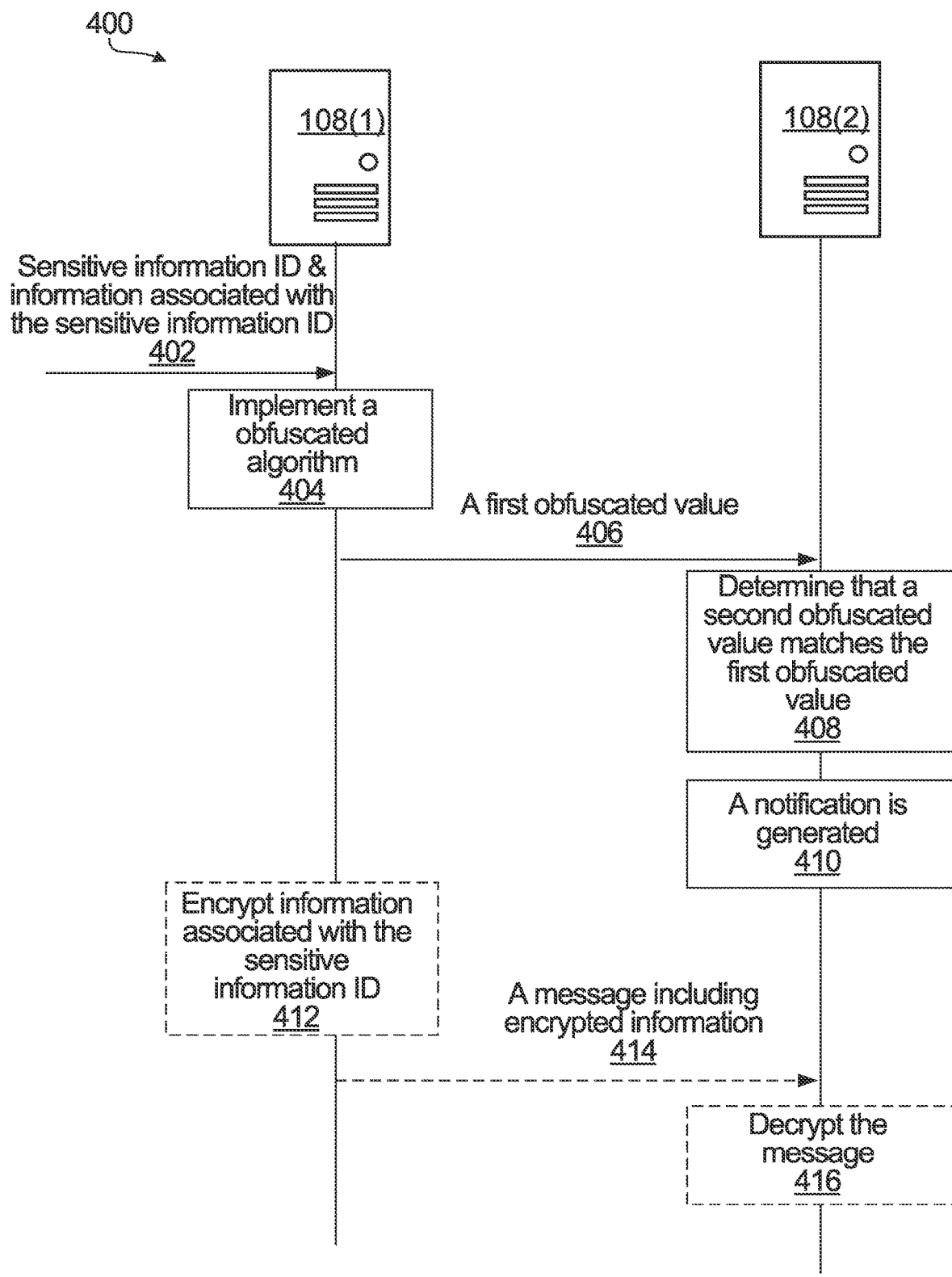
FIG. 4 is a schematic diagram illustrating message exchanges between two different organizations in accordance with example embodiments.

FIG. 4 presents message exchanges 400 between two computing entities (e.g., the first and second server 108(1), 108(2)), in accordance with example embodiments. The first server 108(1) corresponds to a first organization (e.g., HOA, the first casino, or the first subsidiary of a company) associated with a first organization account. The second server 108(2) corresponds to a second organization (e.g., PD, the second casino, or the second subsidiary of the company) associated with a second organization account. The first organization and second organization are two different entities. For ease of illustration, the message exchanges 400 are illustrated by steps implemented by the first and second server 108(1) and 108(2) respectively.

Step 402, the first sever 108(1) may obtain a sensitive information identifier and information associated with the sensitive information identifier from an electronic device 102. The sensitive information includes a license plate number, a badge ID, a biometric ID, to name a few non-limiting examples.

In implementations where the sensitive information relates to a license plate number, the first server 108(1) receives the license plate number and information associated with the license plate number from a remotely disposed image processing device 102. The information associated with the license plate number may include at least one of an image, a context image, a timestamp, and a location. The image captures the license plate number. The context image may show a vehicle associated with the license plate number, rather than the license plate number directly, but may still partially or fully include the license plate. In some applications, the context image may include the license plate number as well. The timestamp indicates a time of capturing the license plate number, and one or more locations indicate where the license plate number was captured. In this example, the license plate number may be extracted from the image by the image processing device 102 and then be transmitted by the image processing device 102. In other examples, the first server 108(1) may receive the image from the image processing device 102 and extract the license plate number from the image and information associated with the license plate number from the image and/or the context image.

In implementations where the sensitive information identifier includes a badge ID, the first server 108(1) may receive a badge ID and information associated with the badge ID from a badge reader 102 or an access control management system used to add and/or remove users from the access control system. The information associated with the badge ID may include at least one of a timestamp and a location. The timestamp indicates a time of reading the badge ID, and the location indicates where the badge ID is read. In this example, the badge ID and the information associated with the badge ID may be extracted by the badge reader 102 and then be transmitted by the badge reader 102. In other examples, the first server 108(1) may receive unanalyzed reads from the badge reader 102 and extract the badge ID and information associated with the badge ID internally.

In implementations where the sensitive information identifier is a biometric ID, the first server 108(1) receives a biometric ID and information associated with the biometric ID from a biometric ID system 102. The information associated with the biometric ID includes at least one of image, a timestamp, and a location. The image captures the biometric ID. The timestamp indicates a time of capturing the biometric ID, and the location indicates a location where the biometric ID is read. In this example, the biometric ID may be extracted from the image by the biometric ID system 102 and then be transmitted by the biometric ID system 102. In other examples, the first server 108(1) may receive the image from the biometric ID system 102 and extract the biometric ID and information associated with the biometric ID from the image internally.

Step 404, in order to determine whether the obtained sensitive information identifier is suspicious or is a wanted license plate number, the first server 108(1) may first obfuscate the obtained sensitive information identifier by implementing an obfuscating algorithm (e.g., hash algorithm and/or encryption) on the obtained sensitive information identifier and generate a first obfuscated value. For ease of illustration, a hash algorithm is illustrated as the obfuscating algorithm in this example, and the first obfuscated value is a first hash value.

The hash algorithm may be a hash algorithm that is commonly used by the first server 108(1) and the second server 108(2). In some examples, the hash algorithm may include a slow hash algorithm a time parameter of which is configured with a desired design such that computing a hash value of each incoming sensitive information identifier and computing hash values of a set of sensitive information identifiers in a list could be accomplished in a reasonable time. In addition, the time parameter of the slow hash algorithm may be set to enable the computation of hash values of database of department of motor vehicles (DMV), all possible license plate combinations, all possible collection of biometric IDs, or all possible collection of badge IDs to be slow enough such that the computation practically cannot be done. For example, a time parameter may be selected or set to compute a hash value of each sensitive information identifier in T1. Accordingly, given the number of sensitive information identifiers in the list is N1, a time period to compute the hash values of the set of sensitive information identifiers will be T1×N1 (T1<=3 minutes and N1<=50). The maximum of T1×N1 would be 150 minutes, which is reasonable. Thus, the computation of the hash value of one sensitive information identifier and the computation of the hash values of the set of sensitive information identifiers in the list could be carried out. However, since the number (N2) of license plate numbers is DMV may be more 1,000,000, a time period to compute hash values in a database of DMW would be T1×N2=3,000,000 minutes, which is impractical. In other examples, a time period (denoted as T3) may be set to update the slow hash algorithm, such as change the salt being used ever T3. Accordingly, the updated slow hash algorithm could be employed in a next obtained sensitive information identifier. Such a manner of setting up the time parameter of the slow hash algorithm may enable the slow hash algorithm to be implemented when multiple organizations sharing the sensitive information identifier.

Step 406, the first server 108(1) (corresponding to the first organization) sends the first hash value to the second server 108(2) (corresponding to the second organization).

Step 408, the second server 108(2) determines that the first hash value matches a second hash value of the plurality of hash values. The second server 108(2) implements the hash algorithm on a set of sensitive information identifiers and generates the plurality of hash values. The set of sensitive information identifiers may be maintained in a list (e.g., a hotlist when the sensitive information identifier is a license plate number, a blacklist regarding the sensitive information identifier related to a badge ID, a list of parking permits, or a cheater database relating to biometric ID) stored in the second server 108(2) or accessible to the second server 108(2). In addition, an association relationship may be generated in a format of a matching table stored in the second server 108(2). As discussed above, the matching table may map the set of sensitive information identifiers to the plurality of hash values. In other examples, the matching table may correspond the plurality of hash values to a plurality of record IDs each of which points to a corresponding sensitive information identifier in the set of sensitive information identifiers. The second server 108(2) looks up the matching table and determines that the second hash value in the matching table matches the first hash value. In the meanwhile, a sensitive information identifier corresponding to the second hash value that matches the first hash value is identified from the matching table or from a record ID pointing to the sensitive information identifier. Thus, the sensitive information identifier is identified.

In some applications, prior to implementing the obfuscating algorithm, the first server 108(1) adds a unique salt to the obtained sensitive information identifier. The unique salt could be a long, unique, and random string, which hard to guess by others. In that case, the second server 108(2) also adds the unique salt to a corresponding sensitive information identifier in the set prior to implementing the hash algorithm on the set of sensitive information. The unique salt corresponds to an organization account of the first server 108(1). Regarding multiple first organizations (e.g., multiple HOAs, different respective casinos, or a plurality of subsidiaries of a company) communicating with the second organization (e.g., the PD, the casino maintaining the cheater database, or the subsidiary being able to access the blacklist), each organization account may be associated with a particular unique salt that is different than those associated with other organizations. The second server 108(2) may store a respective unique salt for a corresponding organization respectively.

Step 410, the second server 108(2) generates a notification of the identified sensitive information identifier. The notification may be used by the user managing the second organization, such as a policeman, a manager of the casino, or a HR manage of the subsidiary. This notification used by the user of the second server 108(2) may be referred to as a first notification which indicates that the sensitive information identifier sent by the first server 108(1) matches an entry in the list. In other alternative examples, the first notification may be generated after step 416 (discussed below), in order to provide the user with the information associated with the sensitive information identifier in addition to the sensitive information identifier.

In some examples, a second notification may be generated by the second server 108(2) and may be included in a request sent to the first server 108(1) to request information associated with the identified sensitive information identifier. The request sent to the first server 108(1) may also include the second hash value of the identified sensitive information identifier. In some examples, the second notification may be identical to the first notification indicating that the sensitive information identifier obtained by the first server 108(1) matches an entry in the list which is accessible by the second server 108(2).

For example, in case the sensitive information identifier is a biometric ID, the server 108(2) associated with a casino "B" accessing the cheater database may send a notification to the server 108(1) associated with a casino "A" that biometric ID "10" matches an entry in the cheater database. Thus, the casino "A" might a person associated with biometric ID "10" from premises of the casino "A".

Optional step 412, in response to the request, the first server 108(1) may encrypt the information associated with the sensitive information identifier received at step 402 using the sensitive information identifier as an encryption key.

In implementations where the sensitive information identifier is a license plate number, the license plate number itself can be used as the encryption key. Accordingly, the encrypted information may include at least one of an encrypted image capturing the identified license plate number, an encrypted context image capturing a vehicle associated with the identified license plate number, an encrypted timestamp indicative of an encrypted time of capturing the identified license plate number, and an encrypted location indicative of a location of the identified license plate number.

In implementations where the sensitive information identifier is a badge ID, the badge ID itself can be used as the encryption key. The encrypted information would include at least one of encrypted timestamp indicative of an encrypted time of reading the badge ID, and an encrypted location indicative of a location of reading the badge ID.

In implementations where the sensitive information identifier is a biometric ID, the first server 108(1) may apply a conversion algorithm to covert the biometric ID (e.g., three-dimensional (3D) facial map) to a sequence of string. The sequence of string may be used as the encryption key. The encrypted information would include an encrypted image capturing the identified biometric ID, an encrypted timestamp indicative of an encrypted time of capturing the identified biometric ID, and an encrypted location indicative of a location of capturing the identified biometric ID.

Optional step 414, the first server 108(1) then sends a message including the encrypted information associated with the sensitive information identifier to the second server 108(2).

Optional step 416, the second sever 108(2) may decrypt the encrypted information associated with the sensitive information identifier using the sensitive information identifier that is identified at step 408. The information decrypted from the encrypted information may be included the notification at step 410.

In implementations where the sensitive information identifier is a license plate number or badge ID, the first server 108(1) and the second server 108(2) may communicate with each other regarding the encryption key in advance. For example, the first server 108(1) informs the second server 108(2) that plaintext in the sensitive information identifier may be used as the encryption key. Thus, the second server 108(2) can extract the plaintext from the identified sensitive information identifier and perform decryption using the plaintext as a decryption key.

In implementations where the sensitive information identifier is a biometric ID, the first server 108(1) and the second server 108(2) communicate with each other regarding the conversion algorithm to covert the biometric ID and the encryption key in advance. For example, the first server 108(1) and the second server 108(2) agree to use a sequence of string representing the biometric ID as the encryption key. Therefore, the second server 108(2) can identify the sequence of string from the identified biometric ID and perform decryption using the sequence of string as a decryption key.

In one possible configuration, the information associated with the sensitive information identifier may be transmitted to the second server 108(2) directly without being encrypted with a key using the sensitive information identifier. In that case, steps 412 and 416 are skipped. Step 414 would send a message including the information associated with the sensitive information identifier to the second server 108(2).

In this example, the information associated with license plate number may be transmitted to the second server 108(2) is sent in response to a request from the second server 108(2). However, it is also possible that without receiving the request, the first server 108(1) sends the message including the encrypted information associated with the license plate number to the second server 108(2) at any step as long as the encrypted information is generated. That is, step 412 may be implemented either before or after step 404. Once the encrypted information is generated, the encrypted information may be sent in any step, for example, the encrypted information may be sent concurrently with the first hash value at step 406.

By sharing hash values, rather than the sensitive information identifier itself, among two organizations, the PD can determine whether the sensitive information identifier captured at a neighborhood is suspicious by comparing the hash value against a plurality of hash values that are generated by performing a hash algorithm on a hotlist. Accordingly, divulging the sensitive information identifier captured remotely from the neighborhood by the HOA may be avoided. In addition, there is no need for the PD to share the hotlist with other organizations, which may help to eliminate privacy concerns.

Implementation 2

Figure 5:
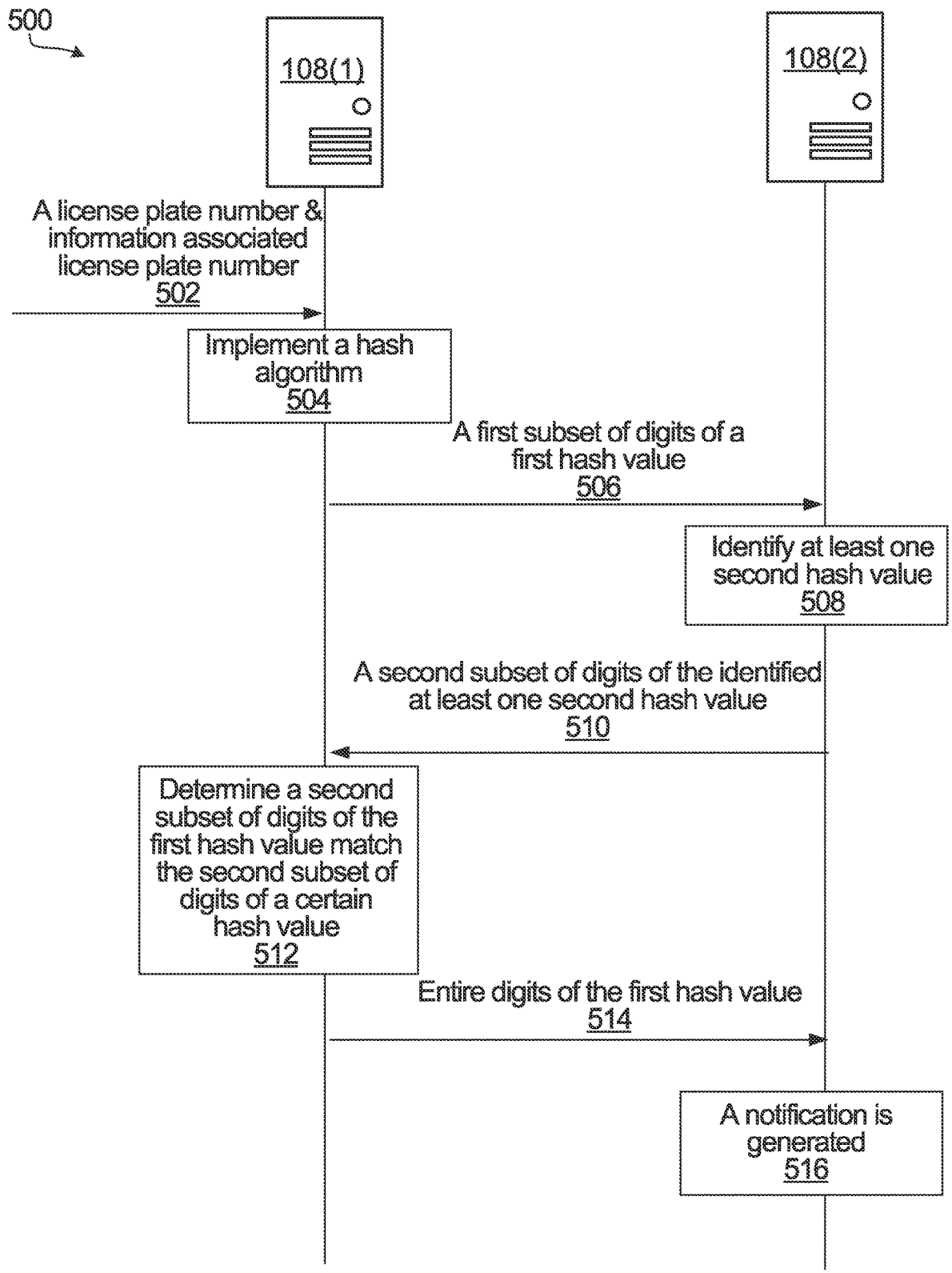
FIG. 5 is a schematic diagram illustrating message exchanges between two different organizations in accordance with alternative example embodiments.

FIG. 5 presents message exchanges 500 between two computing entities (e.g., the first and second server 108(1), 108(2)) to carry out a handshake share solution or a hash-based k-anonymity solution, in accordance with example embodiments. The message exchanges 500 are illustrated by steps implemented by the first and second server 108(1) and 108(2) respectively.

Step 502, the first sever 108(1) may obtain a license plate number and information associated with the license plate number from the remotely disposed image processing device 102. This step is similar to step 402 as discussed above.

Step 504, the first server 108(1) may obfuscate the obtained license plate number by implementing an obfuscating algorithm (e.g., hash algorithm and/or encryption algorithm) on the obtained license plate number and generate a first obfuscated value. This step is also similar to step 404. For ease of illustration, a hash algorithm is illustrated as the obfuscating algorithm in this example, and the first obfuscated value is a first hash value.

Step 506, the first server 108(1) sends a first subset of digits of the first hash value to the second server 108(2). The first organization may be the HOA, and the second organization may be the PD. The first subset of digits may be referred to as a prefix. Compared with set 406, a first subset of digits of the first hash value, rather than entire digits of the first hash value, are transmitted to the second server 108(2). For example, the first hash value is "a1b2c3". The HOA sends the first two digits "a1" to the PD.

Step 508, the second server 108(2) identifies at least one second hash values from a plurality of second hash values. Each of the at least one second hash values includes the first subset of digits of the first hash value. The plurality of second hash values is generated by the second server 108(2) implementing the hash algorithm on a set of license plate numbers, which may be maintained in a hotlist stored in the second server 108(2) or accessible to the second server 108(2). For example, the plurality of second hash values includes "a1b2c3", "a1d4e5", "yyyyy", "zzzzzz", etc. The second server 108(2) identifies that the second hash values "a1b2c3" and "a1d4e5" include the first two digits "a1" of the first hash value "a1b2c3".

Step 510, the second server 108(2) sends a second subset of digits of the identified at least one second hash value to the first server 108(1). Since the second hash values "a1b2c3" and "a1d4e5" are identified, the second server 108(2) may send "b2" and "d4" to the first server 108(1). In this example, the second subset of digits (e.g., two digits) may be less than remaining digits (e.g., 4 digits) of each of the identified at least one second hash value. In other possible configurations, the second subset of digits may include entire digits of each of the identified at least one second hash value. In that case, entire digits of the identified second hash values "a1b2c3" and "a1d4e5" are sent to the first server 108(1).

Step 512, the first server 108(1) determines that a second subset of digits of the first hash value match the second subset of digits of a certain hash value. For example, the first server 108(1) determines that the first hash value "a1b2c3" includes the second subset of digits "b2". In the example where the entire digits of the identified second hash value "a1b2c3" and "a1d4e5" are sent to the first server 108(1), the first sever 108(1) may determine that the first hash value "a1b2c3" match the received second hash value "a1b2c3".

Step 514, the first sever 108(1) then sends a message to the second 108(2). The message may include entire digits of the first hash value and an indication that the certain hash value matches the first hash value.

Step 516, the second server 108(2) generates a notification of the identified license plate number. Once the second server 108(2) receives the notification that the certain hash value matches the first hash value, the second server 108(2) may access an association relationship internally or externally to look up the association relationship, in order to obtain the identified license plate number corresponding to the certain hash value. The association relationship may have a similar format as discussed in the example of FIG. 4. Thus, the notification may be generated and then used by the user managing the second organization, such as a policeman.

In addition, the second server 108(2) may request the first sever 108(1) to send information associated with the identified license plate number. In some alternative examples, the information associated with the identified license plate number may be included in the message sent at step 514.

Alternatively, the message sent at step 514 may include the license plate number corresponding to the entire digits of the first hash value in addition to the indication of the match. In that case, at step 516, the second server 108(2) may generate the notification of the identified license plate number by extracting the license plate number from the received message, rather than looking up the association relationship. Thus, complexity of identifying the license plate number may be reduced once a match is determined.

Subsequent to step 516, alternatively, the first server 108(1) may encrypt the information associated with the license plate number received at step 502 using the license plate number as an encryption key and send a message including the encrypted information associated with the license plate number to the second server 108(2). In addition, the second sever 108(2) may decrypt the encrypted information associated with the license plate number using the identified license plate number that is identified at step 516.

In one possible configuration, the information associated with the license plate number may be transmitted from the first server to the second server 108(2) directly without being encrypted using the license plate number as the encryption key.

The exchanges of the first subset of digits first require only the first subset of digits are matched, and then subsequent second subsets of digits of identified hash values will be shared between the two organizations, which help reduce the possibility of revealing obfuscated sensitive information identifiers among two different organizations. Respective lengths of the first and second subset of digits could be any suitable number that is less than or equal to the entire length of the first hash value. In general, the length of the first subset of digits is less than the entire length. In addition, the length of the second subset of digits is less than or equal to the entire length of the first hash value. There is a tradeoff of sharing the first hash value and/or the second hash values from the PD before a match is determined. The shorter the first subset of digits, the more sensitive information (e.g., the second hash value) will be received from the HOA. The longer the first subset of digits, the more sensitive information (e.g., the first hash value) will be received from the PD.

It is noted that although the example of FIG. 5 illustrates a scenario where a license plate number shared between two organizations is considered as a type of sensitive information identifier, this is illustrative and not intended to be limiting. In other examples, any other suitable sensitive information identifier could be applied in the example of FIG. 5, for example including badge ID, biometric ID, or any suitable personally identifiable identifier.

Implementation 3

Figure 6A:
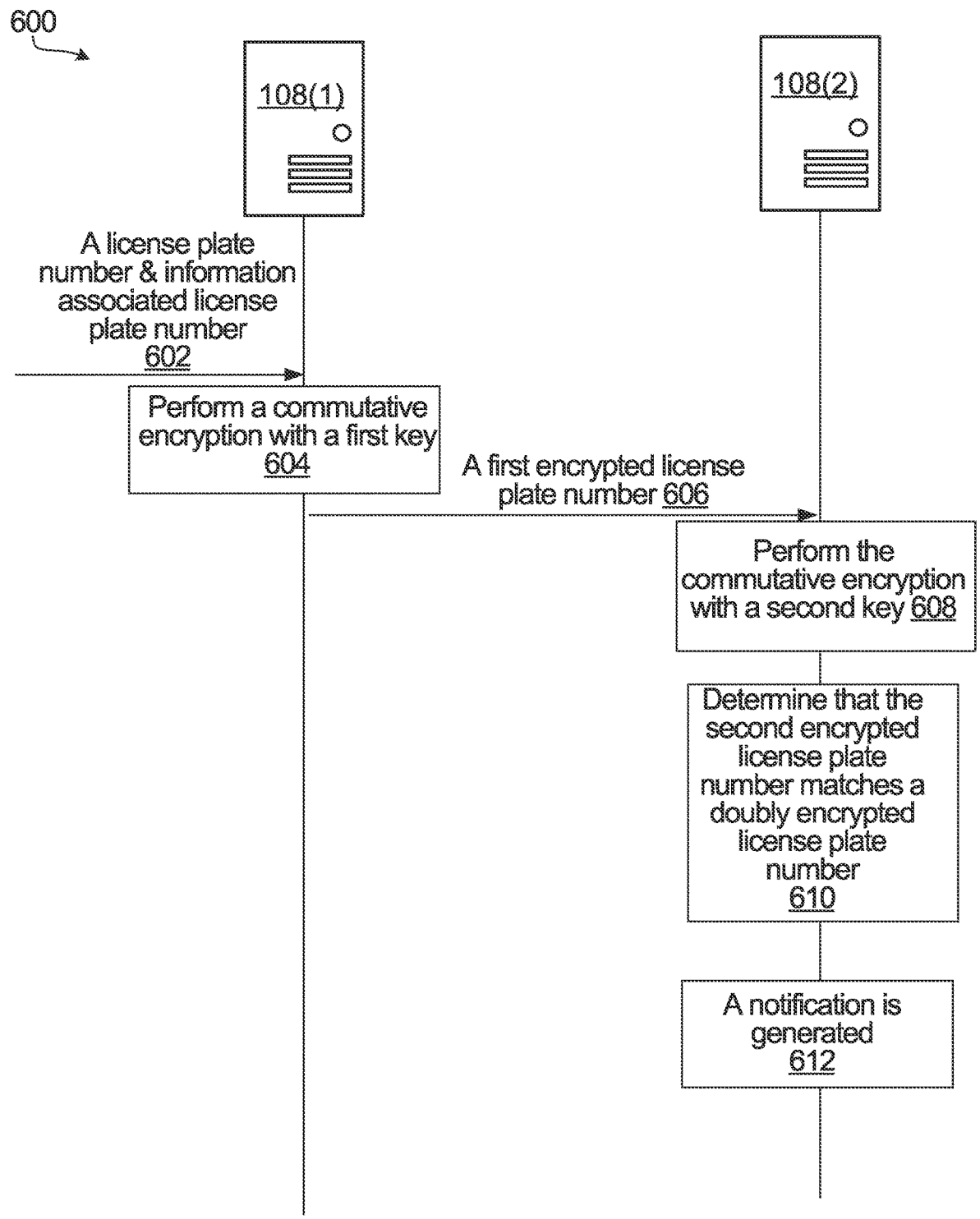
FIG. 6A is a schematic diagram illustrating message exchanges between two different organizations in accordance with another example embodiments.
Figure 6B:
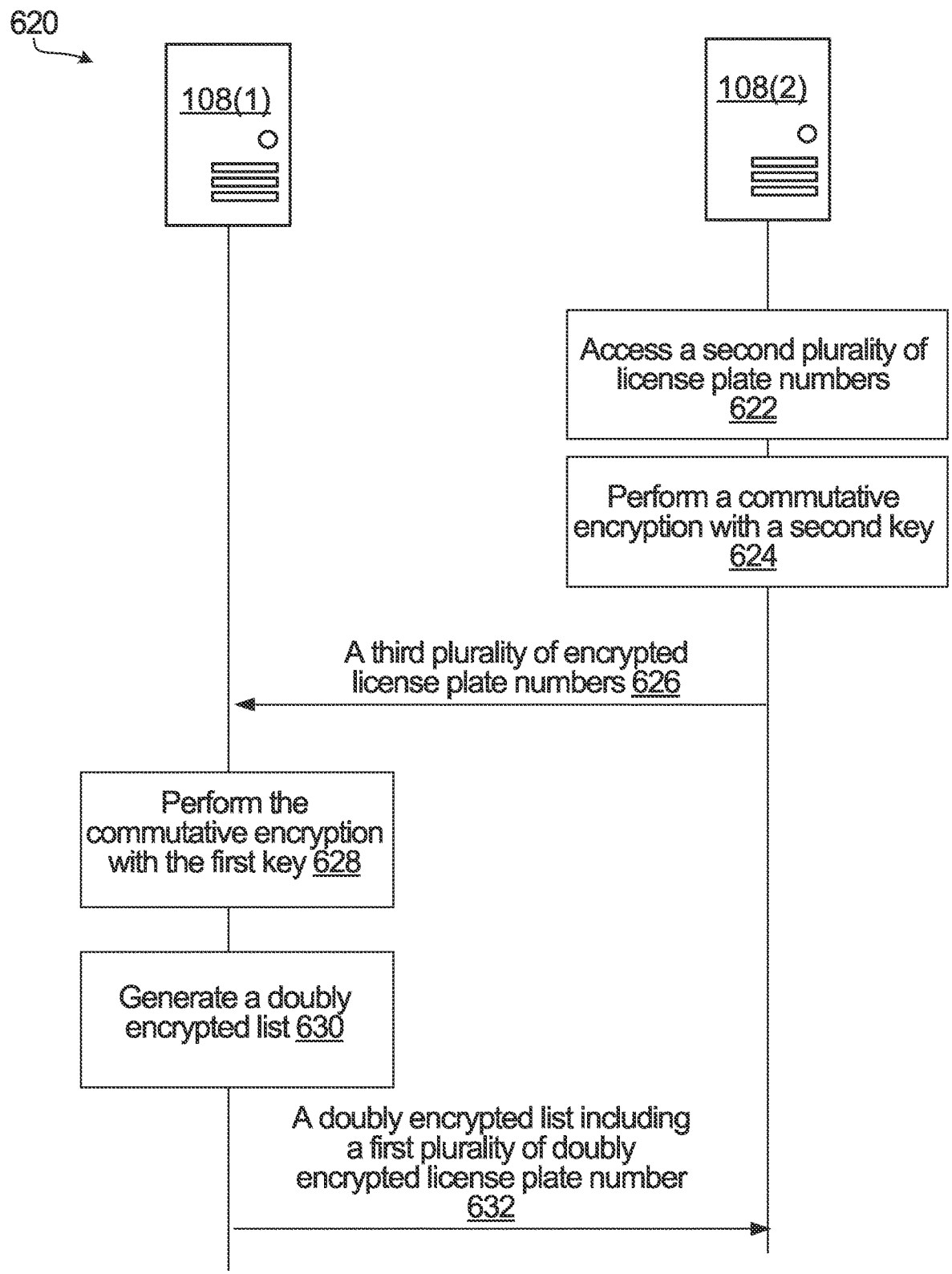
FIG. 6B is a schematic diagram illustrating message exchanges between two different organizations to generate a doubly encrypted list in accordance with example embodiments.

FIGS. 6A-6B present message exchanges 600, 620 between two computing entities (e.g., the first and second server 108(1), 108(2)) to implement a commutative keyed encryption solution, in accordance with example embodiments. For ease of illustration, the message exchanges 600 are illustrated by steps implemented by the first and second server 108(1) and 108(2) respectively which share sensitive information identifier. A license plate number is illustrated in FIGS. 6A-6B as an example of the sensitive information identifier, this is not intended to be limiting. In other example, the sensitive information identifier could be badge ID, biometric ID, or any suitable personally identifiable information.

Step 602, the first sever 108(1) may obtain a license plate number and information associated with the license plate number from the remotely disposed image processing device 102, which is similar to step 402.

Step 604, the first server 108(1) may first implement a commutative encryption algorithm on the obtained license plate number and generate a first encrypted license plate number. The commutative encryption algorithm may be performed using a first key.

Step 606, the first server 108(1) sends the first encrypted license plate number to the second server 108(2).

Step 608, once the second server 108(2) receives the first encrypted license plate number, the second server 108(2) then performs the commutative encryption algorithm on the first encrypted license plate number, using a second key, and generates a second encrypted license plate number.

Step 610, the second server 108(2) then determines that the second encrypted license plate number matches an entry in a doubly encrypted list which may be stored in the second server 108(2) internally, such as in the storage unit 208 as shown in FIG. 2. The doubly encrypted list maps a first plurality of doubly encrypted license plate numbers to a second plurality of license plate numbers. In some applications, the doubly encrypted list may be generated by encrypting a set of license plate numbers that are accessible to the second server 108(2), such as in a hotlist, and may be maintained in a lookup table. FIG. 6B illustrates how the doubly encrypted list can be generated in greater detail below.

Step 612, the second server 108(2) generates a notification of the identified license plate number, which is similar to step 410.

Reference is now made with respect to FIG. 6B, which shows how the doubly encrypted list can be generated by exchanging messages 620 between the first and second server 108(1) and 108(2). In some examples, a set of license plate number, such as in a hotlist, in a plate list, indicated in a list of parking permits, or any list, are accessible to the second server 108(2).

Step 622, the second server 108(2) accesses the set of license plate numbers (also referred to the second plurality of license plate numbers as discussed in step 610).

Step 624, the second server 108(2) performs the commutative encryption algorithm on the set of license plate numbers using the second key and generate a third plurality of encrypted license plate numbers. The third plurality of encrypted license plate numbers are referred to once-encrypted version of the list or the hotlist. In some applications, the second server 108(2) could send the set of license plate numbers to a third-party server (not shown) that generates the third plurality of encrypted license plate numbers. The third-party server then sends the third plurality of encrypted license plate numbers back to the second server 108(2).

Step 626, the second server 108(2) sends the third plurality of encrypted license plate numbers to the first server 108(1).

Step 628, after receiving the third plurality of encrypted license plate numbers, the first server 108(1) performs the commutative encryption algorithm on the third plurality of encrypted license plate numbers using the first key and generates a first plurality of doubly encrypted license plate numbers.

Step 630, the first server 108(1) generates a doubly encrypted list that maps the set of license plate numbers (also referred to the second plurality of license plate numbers) to the third plurality of encrypted license plate numbers and to the first plurality of doubly encrypted license plate numbers.

Step 632, the first server 108(1) sends the doubly encrypted list to the second server 108(2).

As shown in FIG. 6B, the set of license plate numbers in the list are first encrypted by the second server 108(2) using a commutative encryption algorithm, and then sent to the first server 108(1) to further encrypt using the communicate encryption algorithm, and sent back. Such a method helps to prevent the first server 108(1) from being able to see the list clearly and enable the second server 108(2) to check each received license plate number against the doubly encrypted version of the list.

Steps 622-632 to generate the doubly encrypted list could be performed at any time before step 610 when the determination is made. For example, steps 622-632 could be implemented before step 602 such that the doubly encrypted list could be used for the determination implemented by the step 610.

In some application, the first key used by the first server 108(1) may be dynamically changed. In that case, the first server 108(1) can implement the commutative encryption algorithm using the changed first key without affecting any encryption performed at the second server 108(2). For example, after receiving the once-encrypted version of the list at step 626, the first server 108(1) may optionally store the once-encrypted version of the list. Therefore, the first server 108(1) could apply the dynamically changed first key to periodically generate the first plurality of doubly encrypted license plate numbers. In particular, when the first key is changed to a new key, the first server 108(1) may perform the commutative encryption again on the once-encrypted version of the list using the new key. The first server 108(1) then generates a new doubly encrypted list, which is also named as new re-encrypted list and sends the new doubly encrypted list to the second server 108(2). The second server 108(2) may update the doubly encrypted list with the newly received re-encrypted list. Thus, using the dynamically changing key may reduce possibility of divulging sensitive information identifiers significantly. Furthermore, cryptographic agility of obfuscating the sensitive information identifier and a set of sensitive information identifiers in a list may be improved as well.

In one possible configuration, prior to performing the commutative encryption algorithm on the set of license plate numbers using the second key at step 624, the second server 108(2) may add a unique salt to each of the set of license plate numbers in the hotlist and performs a hashing algorithm on each value including the unique salt. In that case, at step 624, the second server 108(2) of FIG. 6B then performs the commutative encryption on the set of hash values to generate the third plurality of encrypted license plate numbers. Similarly, prior to step 604 as shown in FIG. 6A, the first server 108(1) of FIG. 6A may add the unique salt to the received license plate number and perform the hashing algorithm on the value. In that case, at step 604, the first sever 108(1) of FIG. 6A would perform the commutative encryption on the hash value using the first key.

In some examples, the commutative encryption algorithm may utilize a El Gamal public-key encryption algorithm or a Diffie-Hellman algorithm to exchange symmetric key in transport layer security (TLS). Any suitable the commutative encryption algorithm may be used. By way of non-limiting examples, in one possible configuration, an advanced encryption standard (AES) 256 may be additionally applied for the communications between the first server 108(1) and 108(2).

In the examples of FIGS. 6A-6B, an obfuscating algorithm including the commutative algorithm, hashing algorithm, and/or AES 256 is applied between the two servers sharing sensitive information. Such an approach may help to prevent privacy breach.

It is also noted that FIGS. 4, 5, 6A and 6B illustrate that the message exchanges 400, 500, 600, 620 are implemented between two servers of two different respective organizations. However, it is also possible to add, a third server, such as the server 108(3), into the communication system. The third server 108(3) may receive the first obfuscated value generated at the first server 108(1) and a plurality of obfuscated values generated at the second server 108(2) and then determine whether the first obfuscated value matches an entry in the plurality of obfuscated values in the hotlist and identify a license plate number corresponding to the first obfuscated value.

Implementation 4

Figure 7:
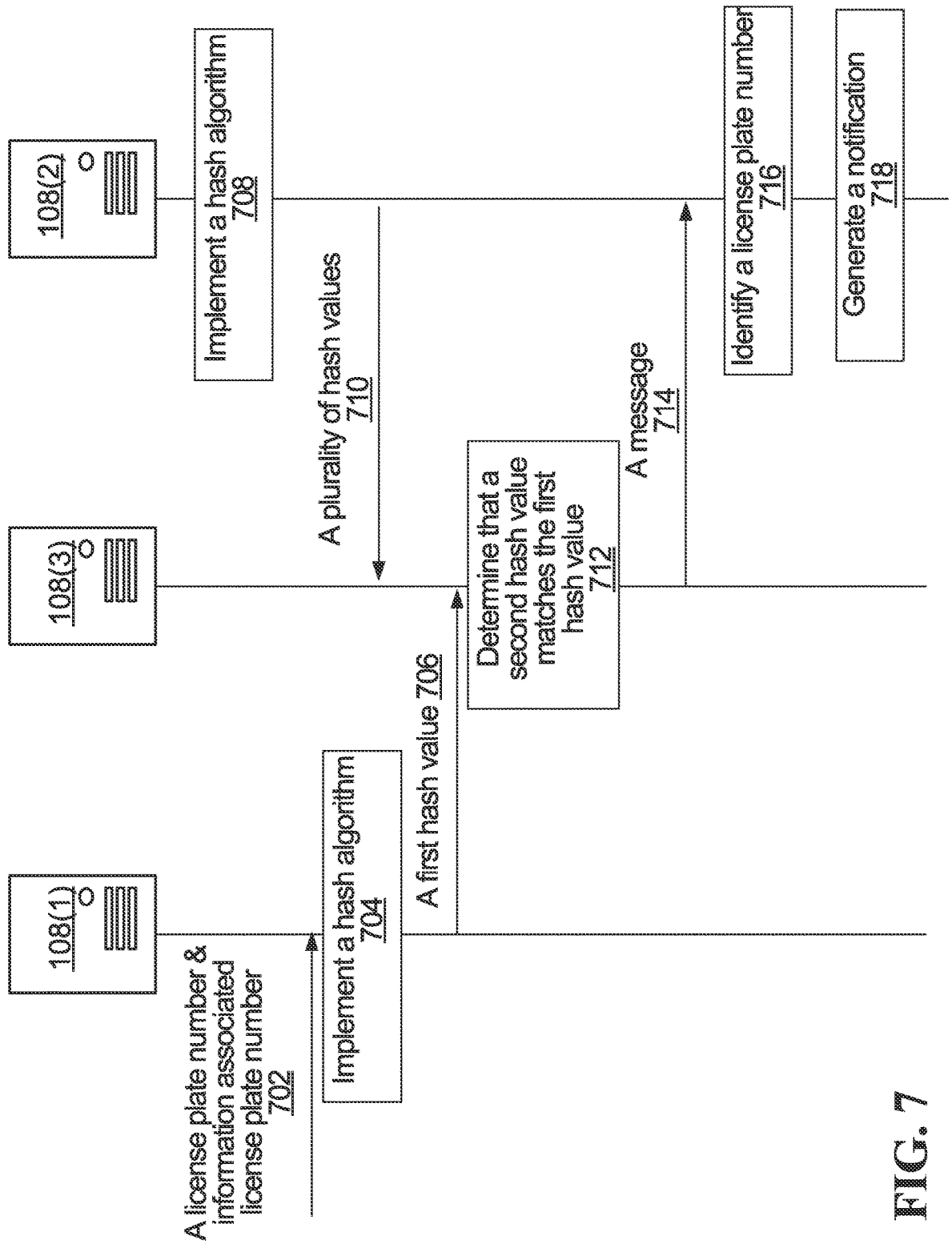
FIG. 7 is a schematic diagram illustrating message exchanges between three different organizations in accordance with alternative example embodiments.

FIG. 7 presents message exchanges 700 between three computing entities (e.g., the first and second server 108(1), 108(2), and the optional third server 108(3)), in accordance with example embodiments, which are collectively used to perform a private set intersect (PSI) solution. The third sever 108(3) may belong to a third party organization that is reliable to both the first and second server 108(1) and 108(2). For ease of illustration, the message exchanges 600 are illustrated by steps implemented by the first, second, and third server 108(1)-108(3) respectively. Taking a license plate number as an example sensitive information identifier:

Step 702, the first sever 108(1) may obtain a license plate number and information associated with the license plate number from the remotely disposed image processing device 102, which is similar to step 402.

Step 704, the first server 108(1) may first obfuscate the obtained license plate number by implementing an obfuscating algorithm (e.g., hash algorithm and/or encryption algorithm) on the obtained license plate number and generate a first obfuscated value, which is could be the first obfuscated value generated at step 404. For ease of illustration, a hash algorithm is illustrated as the obfuscating algorithm in this example, and the first obfuscated value is a first hash value.

Step 706, the third server 108(3) receives the first hash value from the first server 108(1).

Step 708, the second server 108(2) also implements the hash algorithm on a set of license plate numbers stored internally or accessed externally and generates a plurality of hash values.

The hash algorithm may be a pseudo-random function (PRF), which uses a secret key that is inclusive to the first and second server, whereas the third server does not know the secret key.

Step 710, the third server 108(3) receives the plurality of hash values from the second server 108(2).

Step 712, the third server 108(3) determines that a second hash value in the plurality of hash values matches the first hash value.

Step 714, the third server 108(3) then transmits a message to the second server 108(2) to indicate that the second hash value in the plurality of hash values matches the first hash value received from the first server 108(1).

Steps 716, the second server 108(2) identifies a license plate number that corresponds to the second hash value from an association relationship. The association relationship is similar to that is discussed in the example of FIG. 4.

Step 718, the second server 108(2) generates a notification of the identified license plate number, which is similar to step 410.

In some examples, before the first server 108(1) sends the first hash value to the third server 108(3), the first server 108(1) encrypts the first hash value with a first public key and sends the encrypted first hash value to the third server 108(3). The third server 108(3) could then decrypt the encrypted first hash value using a first private key corresponding to the first public key. Alternatively, the third server 108(3) does not decrypt the encrypted first hash value, and could perform its comparison with the encrypted first hash value.

Similarly, before the second server 108(2) sends the plurality of hash values to the third server 108(3), the second server 108(2) encrypts the plurality of hash values with a second public key and sends the plurality of encrypted hash values to the third server 108(3). The third server 108(3) could then decrypt the plurality of encrypted hash values using the second public key and a second private key. Alternatively, the third server 108(3) does not decrypt the plurality of encrypted hash values, and could perform step 712 with the plurality of encrypted hash values and the encrypted first hash value. In some embodiments, the first public key and the second public key are the same public encryption key, and the corresponding private encryption key may be held by the second server 108(2).

Such extra encryption at each side may help to prevent possible sensitive information from being leaked when messages are exchanged between the first and third servers or between the second and third servers.

What is more, the first server 108(1) may optionally send information associated with the license plate number to the third server 108(3), and then the third server 108(3) relays the information associated with the license plate number to the second server 108(2) when it is determined that the second hash value matches the first hash value. In one possible configuration, the information associated with the license plate number may be encrypted at the first server 108(1). The second server 108(2) may decrypt the received encrypted information associated with the license plate number using the identified license plate number as a key.

CONCLUSION

It is noted that in various implementations described here that reference to the first, second, and third servers 108(1)-108(3), the three physical servers 108(1)-108(3) can be interchanged with the first, second, and third cloud organization accounts 106(1)-106(3) respectively.

It should be appreciated that although the license plate number is illustrated as example sensitive information, this is only illustrative and is not intended to be limiting. In other examples, the sensitive information identifier may be a badge ID, biometric ID, or any other suitable personally identifiable information that is captured at remotely disposed electronic devices. In addition, the hash algorithm is described as a type of the obfuscating algorithm to prevent divulging the sensitive information identifier in some examples. However, the obfuscating algorithm may further include performing one or more encryption algorithm before or after performing the hash algorithm or only performing encryption algorithms. In other examples, the obfuscating algorithm may be any other suitable algorithm to avoid sensitive information leaking.

The present disclosure depicts a method of identifying sensitive information identifier (e.g., a license plate number, a badge ID, a biometric ID, a person's full name and/or date of birth, a government issued identifier (e.g., a social insurance number, a driver's license number, a passport number, etc.)) in a privacy-protection manner to ensure security, for example, in a geographic area (e.g., community, campus, or a neighborhood). The sensitive information identifier is obfuscated in various ways and transmitted over multiple organizations in the privacy-protection manner, which may help to prevent privacy related information from being divulged, either from an organization (e.g., HOA, DEA, a business, a campus of a university, a casino, or a subsidiary of a company, etc.) capturing the privacy information or an organization (e.g., law enforcement agency, a government agency, another campus of the university, another casino, or another subsidiary of the company, etc.) maintaining a list.

In addition, once it is determined that the captured sensitive information identifier matches the information in the list, this match may be used to confirm that an entity (e.g., a vehicle or a person) associated with the captured sensitive information identifier broke laws or is a target that an organization (e.g., the law enforcement agency) is looking for. Therefore, the law enforcement agency may identify the sensitive information identifier to investigate the sensitive information identifier in detail, for example, in order to ensure security of a location where the information is captured.

In some applications, information associated with the sensitive information identifier is encrypted using the identified license plate number as an encryption key, which may help to obfuscate the information associated with the sensitive information identifier in a convenient way where both sides will easily access the encryption key. Furthermore, the HOA sends the information associated with the sensitive information identifier (e.g., an image, a context image, a timestamp, and a location) to the PD. Thus, the PD could investigate the identified sensitive information identifier in greater detail, which may help to improve efficiency of the investigation.

According with an example embodiment is a computer-implemented method, which performed at a first computing entity. The first computing entity is configured to access a set of sensitive information identifiers and to communicate with a second computing entity which is configured to obtain a sensitive information identifier. The sensitive information identifier may be captured by an electronic device, for example, from one electronic device of one or more electronic devices distributed in a certain geographic area. The method comprises: receiving a first hash value of the sensitive information identifier from the second computing entity; determining that the first hash value matches a second hash value of a plurality of hash values in an association relationship that maps a respective one of the plurality of hash values to a corresponding sensitive information identifier in the set of sensitive information identifiers, each of the plurality of hash values having been generated by implementing a hash algorithm on the corresponding sensitive information identifier; and generating a notification of an identified sensitive information identifier, the identified sensitive information identifier being identified from the association relationship as corresponding to the first hash value that matches the second hash value.

In alternative examples, the sensitive information identifier includes one or more of a license plate number, a badge identification (ID), a biometric ID, and so on.

In alternative examples, the method further comprises receiving a message from the second computing entity. The message includes encrypted information associated with the identified sensitive information identifier.

In alternative examples, the encrypted information includes at least one of an encrypted image capturing the identified sensitive information identifier, an encrypted context image capturing a vehicle associated with the identified sensitive information identifier, an encrypted timestamp indicative a time of capturing the identified sensitive information identifier, and an encrypted location indicative a location of the identified sensitive information identifier.

In alternative examples, an encryption key used to generate the encrypted information includes the identified sensitive information identifier; and the method further comprises decrypting the message based on the identified sensitive information identifier being identified from the association relationship as corresponding to the first hash value that matches the second hash value.

In alternative examples, the method further comprises sending the notification of the identified sensitive information identifier to the second computing entity; and receiving a message from the second computing entity. The message includes information associated with the identified sensitive information identifier.

In alternative examples, the information includes at least one of an image capturing the identified sensitive information identifier, a context image capturing a vehicle associated with the identified sensitive information identifier, a timestamp indicative a time of capturing the identified sensitive information identifier, and an location indicative a location of the identified sensitive information identifier.

In alternative examples, the hash algorithm includes a slow hash algorithm which is configured with a desired design to generate the plurality of hash values.

In alternative examples, the method further comprises: prior to implementing the hash algorithm, adding a respective one of a plurality of unique salts to the corresponding sensitive information identifier. The plurality of unique salts correspond to an organization account of the first computing entity.

In alternative examples, a cloud server includes the first computing entity corresponding to a first organization account and/or the second computing entity corresponding to a second organization account that is different than the first organization account.

In alternative examples, the first computing entity and the second computing entity are two separate servers.

In alternative examples, the identified sensitive information identifier is identified by: looking up the association relationship; and obtaining the identified sensitive information identifier corresponding to the first hash value.

According to an alternative example embodiment is a computer-implemented method, which is performed at a first computing entity configured to access a set of sensitive information identifiers each of which is obfuscated to a corresponding one of a first plurality of obfuscated values and to communicate with a second computing entity via a third computing entity, the second computing entity being configured to obtain a second plurality of sensitive information identifiers each of which is obfuscated to a corresponding one of a second plurality of obfuscated values. The second plurality of sensitive information identifier may be captured by one or more electronic devices distributed in a certain geographic area. The method comprises: receiving, from the third computing entity, a message indicating that a first obfuscated value from the first plurality of obfuscated values matches a second obfuscated value from the second plurality of obfuscated values; and generating a notification of an identified sensitive information identifier, the identified sensitive information identifier being identified from an association relationship as corresponding to the second obfuscated value that matches the first obfuscated value. The association relationship maps a respective one of the first plurality of obfuscated values to a corresponding sensitive information identifier in the set of the sensitive information identifiers.

In alternative examples, the first plurality of obfuscated values include a first plurality of hash values, each of the set of sensitive information identifiers being obfuscated by implementing a hash algorithm to generate a corresponding one of the first plurality of hash values; and the second plurality of obfuscated values include a second plurality of hash values, each of the second of sensitive information identifiers being obfuscated by implementing the hash algorithm to generate a corresponding one of the second plurality of hash values.

In alternative examples, the method further comprises: receiving a message from the third computing entity. The message includes encrypted information associated with the identified sensitive information identifier.

In alternative examples, the first plurality of obfuscated values is generated using a secret key which is commonly used to generate the second plurality of obfuscated values, and the secret key is exclusively included in the first and second computing entity.

In alternative examples, a cloud server includes the first computing entity corresponding to a first organization account, the second computing entity corresponding to a second organization account, and/or the third computing entity corresponding to a third organization account, the first, second and third organization account being different with respect to each other.

In alternative examples, the first, second, and third computing entity are three separate servers.

In alternative examples, the identified sensitive information identifier is identified by: looking up the association relationship; and obtaining the identified sensitive information identifier corresponding to the second obfuscated value that matches the first obfuscated value.

According to another alternative example embodiment is a computer-implemented method, which is performed at a first computing entity. The first computing entity is configured to access a set of sensitive information identifiers and to communicate with a second computing entity which is configured to obtain a sensitive information identifier. The sensitive information identifier may be captured by an electronic device, for example, from one electronic device of one or more electronic devices distributed in a certain geographic area. The method comprises: receiving a first subset of digits of a first obfuscated value from the second computing entity. The first obfuscated value corresponds to the sensitive information identifier. At least one second obfuscated value from a plurality of second obfuscated values is identified. Each of the at least one second obfuscated value includes the first subset of digits of the first obfuscated value. A second subset of digits of each of the identified at least one second obfuscated value is sent to the second computing entity. A message indicating that a certain obfuscated value of the identified at least one second obfuscated value matches the first obfuscated value is received from the second computing entity. In addition, a notification of an identified sensitive information identifier is generated. The identified sensitive information identifier is identified from an association relationship as corresponding to the certain obfuscated value of the identified at least one second obfuscated value that matches the first obfuscated value. The association relationship maps a respective one of the plurality of second obfuscated values to a corresponding sensitive information identifier of the set of sensitive information identifiers.

In alternative examples, the message further includes encrypted information associated with the identified sensitive information identifier.

In alternative examples, the encrypted information includes at least one of an encrypted image capturing the identified sensitive information identifier, an encrypted context image capturing a vehicle associated with the identified sensitive information identifier, an encrypted timestamp indicative a time of capturing the identified sensitive information identifier, and an encrypted location indicative a location of the identified sensitive information identifier.

In alternative examples, the second subset of digits includes entire digits of each of the identified at least one second obfuscated value.

In alternative examples, the second subset is less than remaining digits of each of the identified at least one second obfuscated value.

In alternative examples, the identified sensitive information identifier is identified by: looking up the association relationship; and obtaining the identified sensitive information identifier corresponding to the first obfuscated value.

According to another alternative example embodiment is a computer-implemented method, which is performed at a first computing entity. The first computing entity is configured to access a second plurality of sensitive information identifiers and to communicate with a second computing entity which is configured to obtain a sensitive information identifier. The sensitive information identifier may be captured by an electronic device, for example, from one electronic device of one or more electronic devices distributed in a certain geographic area. The method comprises: receiving a first encrypted sensitive information identifier from the second computing entity, the first encrypted sensitive information identifier being generated by encrypting the sensitive information identifier with a first key using a commutative encryption algorithm; generating a second encrypted sensitive information identifier by encrypting the first encrypted sensitive information identifier with a second key using the commutative encryption algorithm; determining that the second encrypted sensitive information identifier matches a doubly encrypted sensitive information identifier in a doubly encrypted list that maps a respective one of a first plurality of doubly encrypted sensitive information identifiers to a corresponding one of the second plurality of sensitive information identifiers; and generating a notification of an identified sensitive information identifier, the identified sensitive information identifier being identified from the doubly encrypted list as corresponding to the second encrypted sensitive information identifier that matches the doubly encrypted sensitive information identifier.

In alternative examples, the method further comprises: generating a third plurality of encrypted sensitive information identifiers by encrypting the second plurality of sensitive information identifiers with the second key using the commutative encryption algorithm; sending the third plurality of encrypted sensitive information identifiers to the second computing entity; and receiving the doubly encrypted list from the second computing entity. The doubly encrypted list maps the corresponding one of the second plurality of sensitive information identifiers to a corresponding one of the third plurality of encrypted sensitive information identifiers and to the respective one of the first plurality of doubly encrypted sensitive information identifiers. The respective one of the first plurality of doubly encrypted sensitive information identifiers was generated by encrypting the corresponding one of the third plurality of encrypted sensitive information identifiers with the first key using the commutative encryption algorithm.

In alternative examples, the first key is dynamically changed. When the first key is changed, the first plurality of doubly encrypted sensitive information identifiers are re-generated by encrypting the corresponding one of the third plurality of encrypted sensitive information identifiers with the changed first key using the commutative encryption algorithm, and the doubly encrypted list is updated to map the corresponding one of the second plurality of sensitive information identifiers to a corresponding one of the third plurality of encrypted sensitive information identifiers and to a respective one of the re-generated first plurality of doubly encrypted sensitive information identifiers.

In alternative examples, the method further comprises: receiving a message from the second computing entity. The message includes encrypted information associated with the identified sensitive information identifier.

In alternative examples, the encrypted information includes at least one of an encrypted image capturing the identified sensitive information identifier, an encrypted context image capturing a vehicle associated with the identified sensitive information identifier, an encrypted timestamp indicative a time of capturing the identified sensitive information identifier, and an encrypted location indicative a location of the identified sensitive information identifier.

In alternative examples, the identified sensitive information identifier is identified by: looking up the doubly encrypted list; and obtaining the identified sensitive information identifier corresponding to the second encrypted sensitive information identifier.

According to another alternative example embodiment is an apparatus configured to access a set of sensitive information identifiers and to communicate with a second computing entity which is configured to obtain a sensitive information identifier. The sensitive information identifier may be captured by an electronic device, for example, from one electronic device of one or more electronic devices distributed in a certain geographic area. The apparatus comprises: one or more processor; memory; and one or more programs. The one or more programs are stored in the memory and configured to be executed by the one or more processors. The programs including: instructions for receiving a first hash value of the sensitive information identifier from the second computing entity; instructions for determining that the first hash value matches a second hash value of a plurality of hash values in an association relationship that maps a respective one of the plurality of hash values to a corresponding sensitive information identifier in the set of sensitive information identifiers, each of the plurality of hash values having been generated by implementing a hash algorithm on the corresponding sensitive information identifier; and instructions for generating a notification of an identified sensitive information identifier. The identified sensitive information identifier is identified from the association relationship as corresponding to the first hash value that matches the second hash value.

According to another alternative example embodiment is a computer readable storage medium having stored therein instructions, which when executed by a device, cause the device to: receive a first hash value of a sensitive information identifier from a second computing entity. The second computing entity is configured to obtain a sensitive information identifier and to communicate with the device that is configured to access a set of sensitive information identifiers; determine that the first hash value matches a second hash value of a plurality of hash values in an association relationship that maps a respective one of the plurality of hash values to a corresponding sensitive information identifier in the set of sensitive information identifiers, each of the plurality of hash values having been generated by implementing a hash algorithm on the corresponding sensitive information identifier; and generate a notification of an identified sensitive information identifier, the identified sensitive information identifier being identified from the association relationship as corresponding to the first hash value that matches the second hash value.

According to another alternative example embodiment is an apparatus configured to access a set of sensitive information identifiers each of which is obfuscated to a corresponding one of a first plurality of obfuscated values and to communicate with a second computing entity via a third computing entity. The second computing entity is configured to obtain a second plurality of sensitive information identifiers each of which is obfuscated to a corresponding one of a second plurality of obfuscated values, the apparatus comprises: one or more processor; memory; and one or more programs. The one or more programs are stored in the memory and configured to be executed by the one or more processors. The programs including: instructions for receiving, from the third computing entity, a message indicating that a first obfuscated value from the first plurality of obfuscated values matches a second obfuscated value from the second plurality of obfuscated values; and instructions for generating a notification of an identified sensitive information identifier, the identified sensitive information identifier being identified from an association relationship as corresponding to the second obfuscated value that matches the first obfuscated value. The association relationship maps a respective one of the first plurality of obfuscated values to a corresponding sensitive information identifier in the set of the sensitive information identifiers.

According to another alternative example embodiment is a computer readable storage medium having stored therein instructions, which when executed by a device which is configured to access a set of sensitive information identifiers each of which is obfuscated to a corresponding one of a first plurality of obfuscated values and to communicate with a second computing entity via a third computing entity, the second computing entity being configured to obtain a second plurality of sensitive information identifiers each of which is obfuscated to a corresponding one of a second plurality of obfuscated values, cause the device to: receive, from the device, a message indicating that a first obfuscated value from the first plurality of obfuscated values matches a second obfuscated value from the second plurality of obfuscated values; and generating a notification of an identified sensitive information identifier, the identified sensitive information identifier being identified from an association relationship as corresponding to the second obfuscated value that matches the first obfuscated value. The association relationship maps a respective one of the first plurality of obfuscated values to a corresponding sensitive information identifier in the set of the sensitive information identifiers.

According to another alternative example embodiment is an apparatus configured to access a set of sensitive information identifiers and to communicate with a second computing entity which is configured to obtain a sensitive information identifier. The sensitive information identifier may be captured by an electronic device, for example, from one electronic device of one or more electronic devices distributed in a certain geographic area. The apparatus comprises: one or more processor; memory; and one or more programs. The one or more programs are stored in the memory and configured to be executed by the one or more processors, the programs including: instructions for receiving a first subset of digits of a first obfuscated value from a second computing entity. The first obfuscated value corresponds to a sensitive information identifier; instructions for identifying at least one second obfuscated value from a plurality of second obfuscated values. Each of the at least one second obfuscated value includes the first subset of digits of the first obfuscated value. Instructions are for sending a second subset of digits of each of the identified at least one second obfuscated value to the second computing entity. Instructions are for receiving, from the second computing entity, a message indicating that a certain obfuscated value of the identified at least one second obfuscated value matches the first obfuscated value; and instructions for generating a notification of an identified sensitive information identifier, the identified sensitive information identifier being identified from an association relationship as corresponding to the certain obfuscated value of the identified at least one second obfuscated value that matches the first obfuscated value. The association relationship maps a respective one of the plurality of second obfuscated values to a corresponding sensitive information identifier.

According to another alternative example embodiment is a computer readable storage medium having stored therein instructions, which when executed by a device, cause the device to: receive a first subset of digits of a first obfuscated value from a second computing entity. The first obfuscated value corresponds to a sensitive information identifier; identify at least one second obfuscated value from a plurality of second obfuscated values. Each of the at least one second obfuscated value includes the first subset of digits of the first obfuscated value; send a second subset of digits of each of the identified at least one second obfuscated value to the second computing entity; receive, from the second computing entity, a message indicating that a certain obfuscated value of the identified at least one second obfuscated value matches the first obfuscated value; and generate a notification of an identified sensitive information identifier, the identified sensitive information identifier being identified from an association relationship as corresponding to the certain obfuscated value of the identified at least one second obfuscated value that matches the first obfuscated value. The association relationship maps a respective one of the plurality of second obfuscated values to a corresponding sensitive information identifier.

According to another alternative example embodiment is an apparatus which is configured to access a set of sensitive information identifiers and to communicate with a second computing entity which is configured to obtain a sensitive information identifier. The sensitive information identifier may be captured by an electronic device, for example, from one or more electronic devices distributed in a certain geographic area. The apparatus comprises: one or more processor; memory; and one or more programs. The one or more programs are stored in the memory and configured to be executed by the one or more processors. the programs include: instructions for receiving a first encrypted sensitive information identifier from a second computing entity, the first encrypted sensitive information identifier being generated by encrypting a sensitive information identifier with a first key using a commutative encryption algorithm; instructions for generating a second encrypted sensitive information identifier by encrypting the first encrypted sensitive information identifier with a second key using the commutative encryption algorithm; instructions for determining that the second encrypted sensitive information identifier matches a doubly encrypted sensitive information identifier in a doubly encrypted list that maps a respective one of a first plurality of doubly encrypted sensitive information identifiers to a corresponding one of a second plurality of sensitive information identifiers; and instructions for generating a notification of an identified sensitive information identifier, the identified sensitive information identifier being identified from the doubly encrypted list as corresponding to the second encrypted sensitive information identifier that matches the doubly encrypted sensitive information identifier.

According to another alternative example embodiment is a computer readable storage medium having stored therein instructions, which when executed by a device, cause the device to: receive a first encrypted sensitive information identifier from a second computing entity, the first encrypted sensitive information identifier being generated by encrypting a sensitive information identifier with a first key using a commutative encryption algorithm; generate a second encrypted sensitive information identifier by encrypting the first encrypted sensitive information identifier with a second key using the commutative encryption algorithm; determine that the second encrypted sensitive information identifier matches a doubly encrypted sensitive information identifier in a doubly encrypted list that maps a respective one of a first plurality of doubly encrypted sensitive information identifiers to a corresponding one of a second plurality of sensitive information identifiers; and generate a notification of an identified sensitive information identifier, the identified sensitive information identifier being identified from the doubly encrypted list as corresponding to the second encrypted sensitive information identifier that matches the doubly encrypted sensitive information identifier.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, certain technical solutions of the present disclosure may be embodied in the form of a software product. A suitable software product may be stored in a pre-recorded storage device or other similar non-volatile or non-transitory computer readable medium, for example. The software product includes instructions tangibly stored thereon that enable a processing device (e.g., a microprocessor) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

Although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method, performed at a first computing entity which is configured to access a set of license plate numbers and to communicate with a second computing entity which is configured to obtain a license plate number that is captured by one of one or more license plate recognition devices distributed in a certain geographic area, the method comprising:
receiving a first hash value of the license plate number from the second computing entity;
determining that the first hash value matches a second hash value of a plurality of hash values in an association relationship that maps a respective one of the plurality of hash values to a corresponding license plate number in the set of license plate numbers, each of the plurality of hash values having been generated by implementing a hash algorithm on the corresponding license plate number; and
generating a notification of an identified license plate number, the identified license plate number being identified from the association relationship as corresponding to the first hash value that matches the second hash value.

2. The method defined in claim 1, further comprising:
receiving a message from the second computing entity, wherein the message includes encrypted information associated with the identified license plate number.

3. The method defined in claim 2, wherein the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

4. The method defined in claim 2, wherein an encryption key used to generate the encrypted information includes the identified license plate number; and wherein the method further comprises:
decrypting the message based on the identified license plate number being identified from the association relationship as corresponding to the first hash value that matches the second hash value.

5. The method defined in claim 1, further comprising:
sending the notification of the identified license plate number to the second computing entity; and
receiving a message from the second computing entity, wherein the message includes information associated with the identified license plate number.

6. The method defined in claim 5, wherein the information includes at least one of an image capturing the identified license plate number, a context image capturing a vehicle associated with the identified license plate number, a timestamp indicative a time of capturing the identified license plate number, and an location indicative a location of the identified license plate number.

7. The method defined in claim 1, wherein the hash algorithm includes a slow hash algorithm which is configured with a desired design to generate the plurality of hash values.

8. The method defined in claim 1, further comprising prior to implementing the hash algorithm, adding a respective one of a plurality of unique salts to the corresponding license plate number, wherein the plurality of unique salts corresponds to an organization account of the first computing entity.

9. The method defined in claim 1, wherein a cloud server includes the first computing entity corresponding to a first organization account and/or the second computing entity corresponding to a second organization account that is different than the first organization account.

10. The method defined in claim 1, wherein the first computing entity and the second computing entity are two separate servers.

11. The method defined in claim 1, wherein the identified license plate number is identified by:
looking up the association relationship; and
obtaining the identified license plate number corresponding to the first hash value.

12. A computer-implemented method, performed at a first computing entity configured to access a set of license plate numbers each of which is obfuscated to a corresponding one of a first plurality of obfuscated values and to communicate with a second computing entity via a third computing entity, the second computing entity being configured to obtain a second plurality of license plate numbers each of which is obfuscated to a corresponding one of a second plurality of obfuscated values, the second plurality of license plate number being captured by one or more license plate recognition devices distributed in a certain geographic area, the method comprising:
receiving, from the third computing entity, a message indicating that a first obfuscated value from the first plurality of obfuscated values matches a second obfuscated value from the second plurality of obfuscated values; and
generating a notification of an identified license plate number, the identified license plate number being identified from an association relationship as corresponding to the second obfuscated value that matches the first obfuscated value, wherein the association relationship maps a respective one of the first plurality of obfuscated values to a corresponding license plate number in the set of the license plate numbers.

13. The method defined in claim 12, wherein the first plurality of obfuscated values include a first plurality of hash values, each of the set of license plate numbers being obfuscated by implementing a hash algorithm to generate a corresponding one of the first plurality of hash values; and
the second plurality of obfuscated values include a second plurality of hash values, each of the second of license plate numbers being obfuscated by implementing the hash algorithm to generate a corresponding one of the second plurality of hash values.

14. The method defined in claim 12, further comprising:
receiving a message from the third computing entity, wherein the message includes encrypted information associated with the identified license plate number.

15. The method defined in claim 12, wherein the first plurality of obfuscated values is generated using a secret key which is commonly used to generate the second plurality of obfuscated values, and the secret key is exclusively included in the first and second computing entity.

16. The method defined in claim 12, wherein a cloud server includes the first computing entity corresponding to a first organization account, the second computing entity corresponding to a second organization account, and/or the third computing entity corresponding to a third organization account, the first, second and third organization account being different with respect to each other.

17. The method defined in claim 12, wherein the first, second, and third computing entity are three separate servers.

18. The method defined in claim 12, wherein the identified license plate number is identified by:
looking up the association relationship; and
obtaining the identified license plate number corresponding to the second obfuscated value that matches the first obfuscated value.

19. A computer-implemented method, performed at a first computing entity which is configured to access a set of license plate numbers and to communicate with a second computing entity which is configured to obtain a license plate number that is captured by one of one or more license plate recognition devices distributed in a certain geographic area, the method comprising:
receiving a first subset of digits of a first obfuscated value from the second computing entity, wherein the first obfuscated value corresponds to the license plate number;
identifying at least one second obfuscated value from a plurality of second obfuscated values, wherein each of the at least one second obfuscated value includes the first subset of digits of the first obfuscated value;
sending a second subset of digits of each of the identified at least one second obfuscated value to the second computing entity;
receiving, from the second computing entity, a message indicating that a certain obfuscated value of the identified at least one second obfuscated value matches the first obfuscated value; and
generating a notification of an identified license plate number, the identified license plate number being identified from an association relationship as corresponding to the certain obfuscated value of the identified at least one second obfuscated value that matches the first obfuscated value, wherein the association relationship maps a respective one of the plurality of second obfuscated values to a corresponding license plate number of the set of license plate numbers.

20. The method defined in claim 19, wherein the message further includes encrypted information associated with the identified license plate number.

21. The method defined in claim 20, wherein the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

22. The method defined in claim 19, wherein the second subset of digits includes entire digits of each of the identified at least one second obfuscated value.

23. The method defined in claim 19, wherein the second subset is less than remaining digits of each of the identified at least one second obfuscated value.

24. The method defined in claim 19, wherein the identified license plate number is identified by:
looking up the association relationship; and
obtaining the identified license plate number corresponding to the first obfuscated value.

25. A computer-implemented method, performed at a first computing entity which is configured to access a second plurality of license plate numbers and to communicate with a second computing entity which is configured to obtain a license plate number that is captured by one of one or more license plate recognition devices distributed in a certain geographic area, the method comprising:
receiving a first encrypted license plate number from the second computing entity, the first encrypted license plate number being generated by encrypting the license plate number with a first key using a commutative encryption algorithm;
generating a second encrypted license plate number by encrypting the first encrypted license plate number with a second key using the commutative encryption algorithm;
determining that the second encrypted license plate number matches a doubly encrypted license plate number in a doubly encrypted list that maps a respective one of a first plurality of doubly encrypted license plate numbers to a corresponding one of the second plurality of license plate numbers; and
generating a notification of an identified license plate number, the identified license plate number being identified from the doubly encrypted list as corresponding to the second encrypted license plate number that matches the doubly encrypted license plate number.

26. The method defined in claim 25, further comprising:
generating a third plurality of encrypted license plate numbers by encrypting the second plurality of license plate numbers with the second key using the commutative encryption algorithm;
sending the third plurality of encrypted license plate numbers to the second computing entity; and
receiving the doubly encrypted list from the second computing entity, wherein the doubly encrypted list maps the corresponding one of the second plurality of license plate numbers to a corresponding one of the third plurality of encrypted license plate numbers and to the respective one of the first plurality of doubly encrypted license plate numbers, wherein the respective one of the first plurality of doubly encrypted license plate numbers was generated by encrypting the corresponding one of the third plurality of encrypted license plate numbers with the first key using the commutative encryption algorithm.

27. The method defined in claim 26, wherein the first key is periodically changed, when the first key is changed, the first plurality of doubly encrypted license plate numbers are re-generated by encrypting the corresponding one of the third plurality of encrypted license plate numbers with the changed first key using the commutative encryption algorithm, and the doubly encrypted list is updated to map the corresponding one of the second plurality of license plate numbers to a corresponding one of the third plurality of encrypted license plate numbers and to a respective one of the re-generated first plurality of doubly encrypted license plate numbers.

28. The method defined in claim 25, further comprising:
receiving a message from the second computing entity, wherein the message includes encrypted information associated with the identified license plate number.

29. The method defined in claim 28, wherein the encrypted information includes at least one of an encrypted image capturing the identified license plate number, an encrypted context image capturing a vehicle associated with the identified license plate number, an encrypted timestamp indicative a time of capturing the identified license plate number, and an encrypted location indicative a location of the identified license plate number.

30. The method defined in claim 25, wherein the identified license plate number is identified by: looking up the doubly encrypted list; and obtaining the identified license plate number corresponding to the second encrypted license plate number.

* * * * *